March 5, 1968   M. BUDZICH ET AL   3,371,377
APPARATUS FOR MAKING COMMUNICATIONS PLUGS
Filed Jan. 20, 1966   16 Sheets-Sheet 1

INVENTORS
M. BUDZICH
W.W. CUNNINGHAM JR.
BY [signature]
ATTORNEY

March 5, 1968   M. BUDZICH ET AL   3,371,377
APPARATUS FOR MAKING COMMUNICATIONS PLUGS
Filed Jan. 20, 1966   16 Sheets-Sheet 7

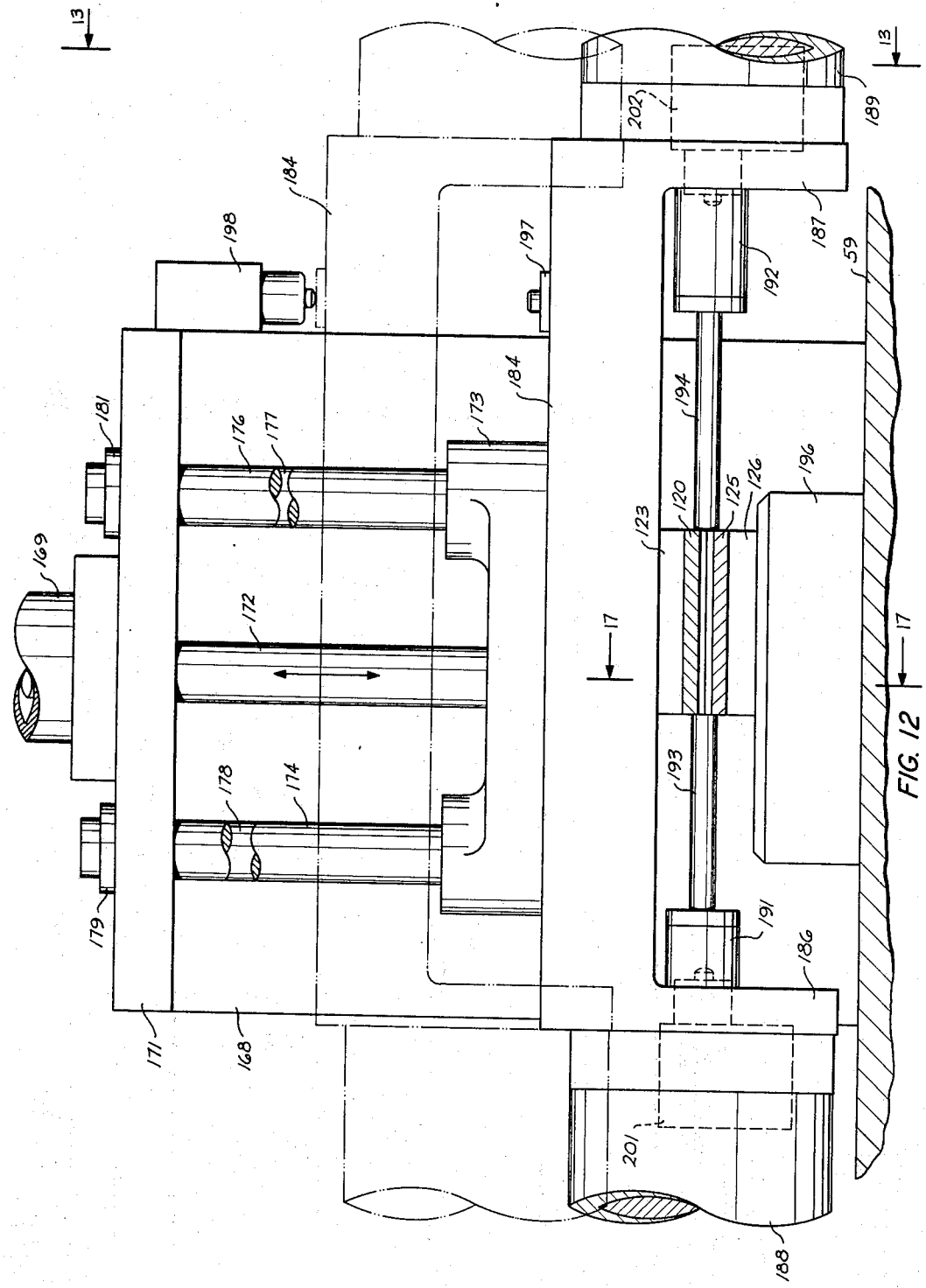

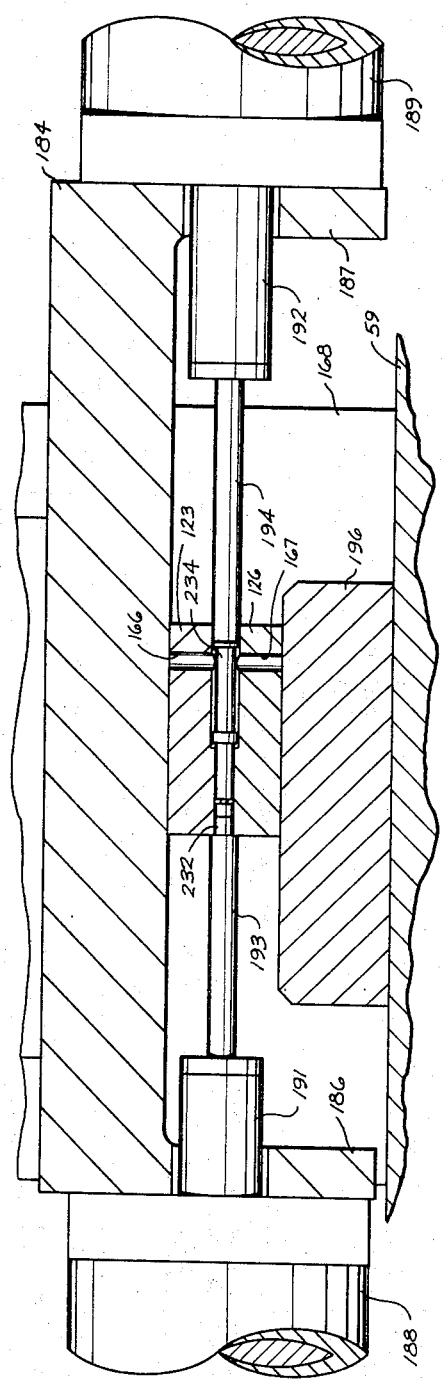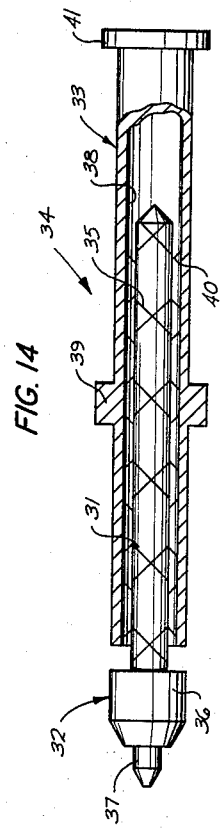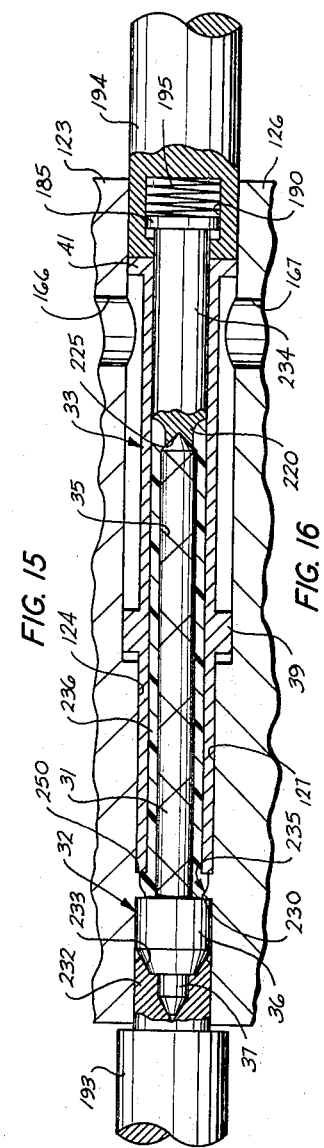

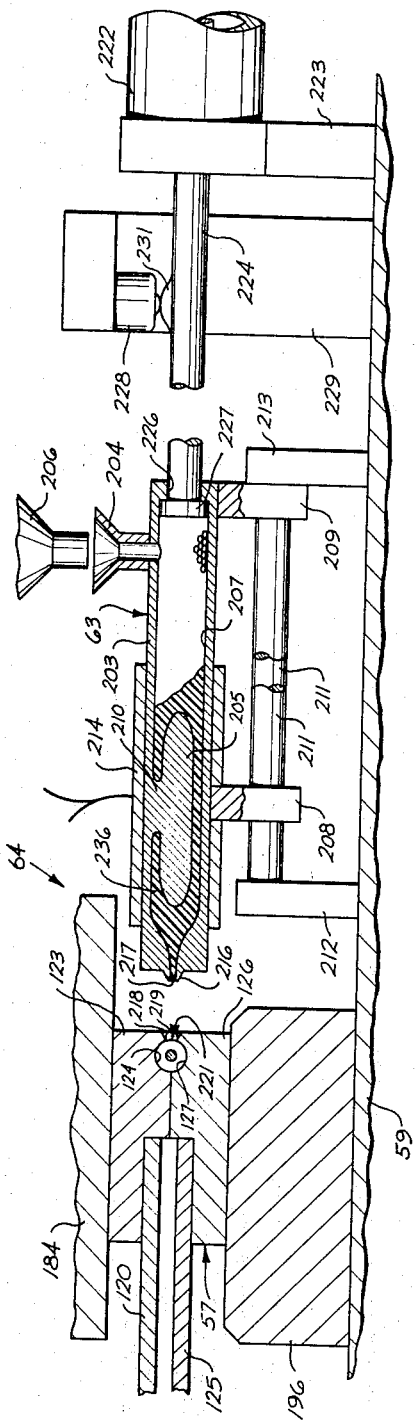
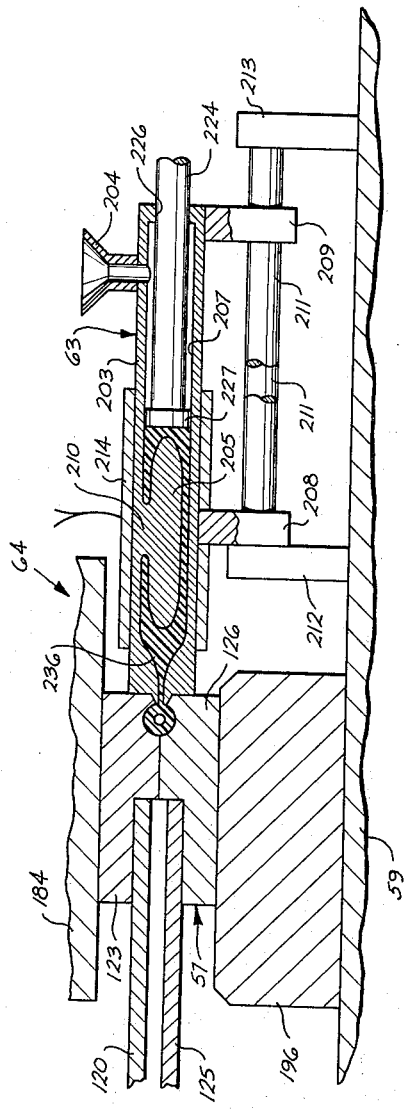
FIG. 17
FIG. 18

March 5, 1968 M. BUDZICH ET AL 3,371,377
APPARATUS FOR MAKING COMMUNICATIONS PLUGS
Filed Jan. 20, 1966 16 Sheets-Sheet 12

March 5, 1968  M. BUDZICH ET AL  3,371,377
APPARATUS FOR MAKING COMMUNICATIONS PLUGS
Filed Jan. 20, 1966  16 Sheets-Sheet 13
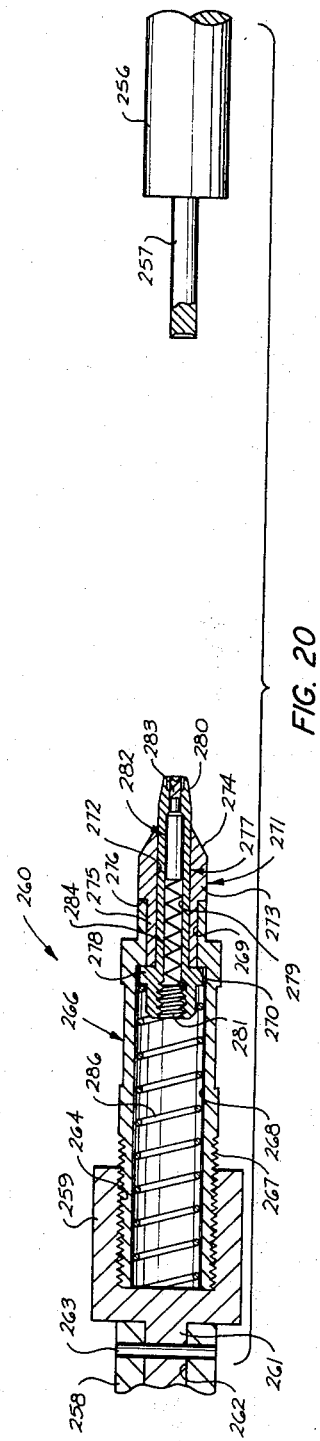
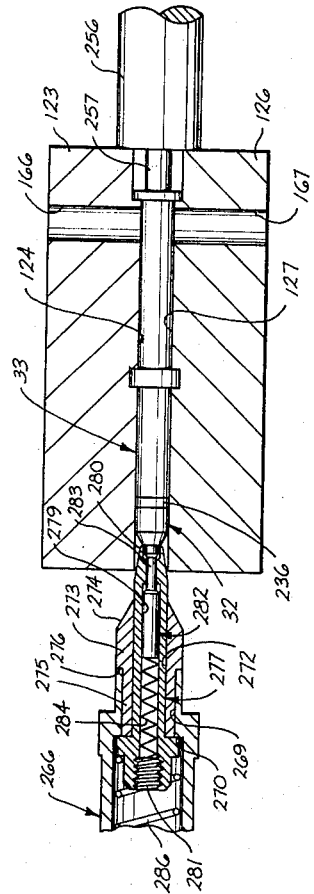
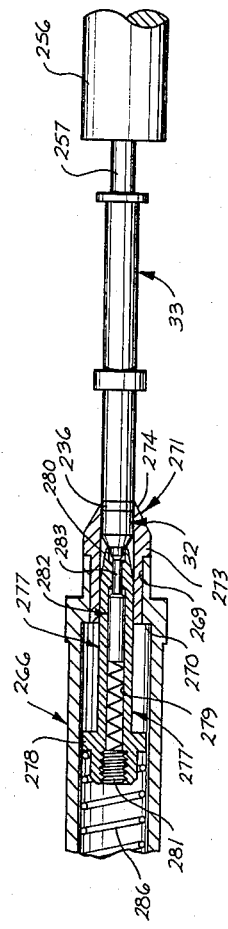

March 5, 1968  M. BUDZICH ET AL  3,371,377
APPARATUS FOR MAKING COMMUNICATIONS PLUGS
Filed Jan. 20, 1966  16 Sheets-Sheet 14

United States Patent Office 3,371,377
Patented Mar. 5, 1968

3,371,377
APPARATUS FOR MAKING COMMUNICATIONS PLUGS
Mieczyslaw Budzich, Dundalk, and William W. Cunningham, Jr., Middle River, Md., assignors to Western Electric Company, Incorporated, New York, N.Y., a corporation of New York
Filed Jan. 20, 1966, Ser. No. 521,898
10 Claims. (Cl. 18—5)

ABSTRACT OF THE DISCLOSURE

An apparatus for assembling communications plug elements and for insulating the plug elements electrically from each other to form a plug. Mating plug elements are preassembled automatically at an assembly station and are transferred automatically into one of a plurality of molds arranged radially on an indexable turntable. The turntable is indexed to a molding station whereat an insulating compound is injected into the mold and between the preassembled plug elements to form the plug. The turntable is again indexed where the insulating compound cures and the plug is ejected at an unloading station.

---

This invention relates to apparatus for making electrical plugs, and more particularly relates to apparatus for assembling communications plug elements and for insulating the plug elements electrically from each other.

Communication plugs of the type used on switchboards in telephone exchanges must be constructed ruggedly to withstand being rapidly and repeatedly inserted into and removed from jacks in the switchboard by telephone operators. In making connections and disconnections, the plugs are subjected to stresses, strains and wear which tend to make it necessary to replace the plugs periodically. In manufacturing such plugs for the telephone industry, it has been necessary to utilize time-consuming manual efforts in assembling the various elements which form the unit plug. In addition, intermediate steps were required for insulating the assembled plug elements from each other to facilitate making the desired electrical connections and prevent electrical breakdown between circuits when the plugs are inserted into switchboard jacks.

During the insulating of the elements of the plug from each other, precision locating is necessary to facilitate the support of the elements with a minimum clearance therebetween to ensure that adequate insulating compound is placed between the elements. Further, the dimensions and structure of the elements of the plug necessitate precise locating of the plug during the assembly thereof to facilitate the manufacture of plugs having a standard length.

It is, therefore, an object of this invention to provide a new and improved apparatus for making plugs.

Another object of this invention is to provide new and improved apparatus for automatically assembling plug elements and for insulating the assembled plug elements electrically from each other.

An apparatus embodying certain principles of the invention may include means for inserting loosely a plug center pin into a plug sleeve to form a pin-sleeve assembly, means for gripping the pin securely, transporting the pin with the loose sleeve thereon and positioning the pin-sleeve assembly into a complementarily shaped surface of a separable mold. Means are provided for injecting an insulating compound into the mold and between the pin and sleeve, which are supported in spaced relationship within the mold. Means are also provided for removing the insulated pin-sleeve assembly away from the separable mold.

Other objects and advantages of the invention will appear from the following detailed description of a specific embodiment thereof, when read in conjunction with the appended drawings, in which.

Figure 1:
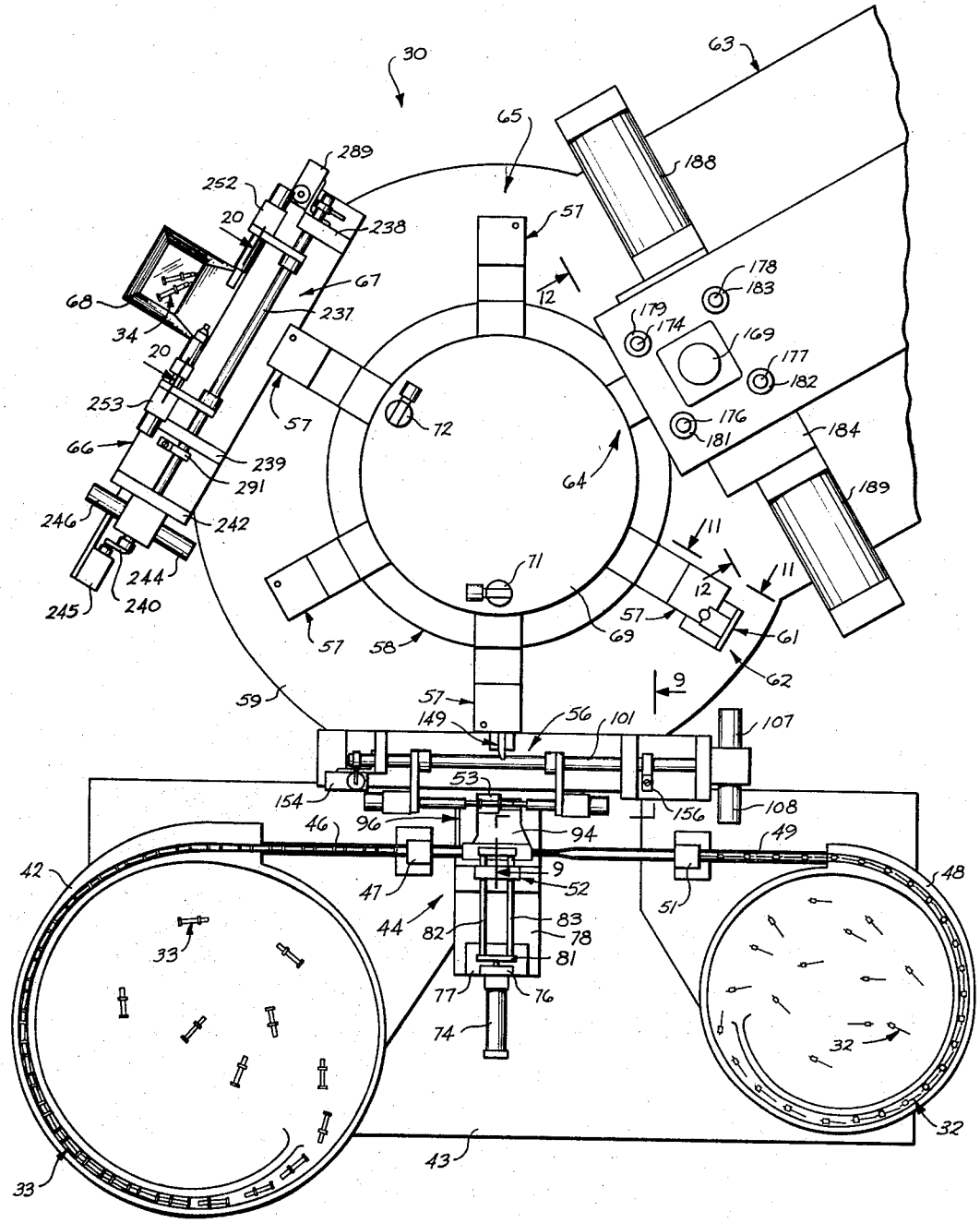
FIG. 1 is a fragmentary plan view of a plug assembly and insulating apparatus embodying certain principles of the invention.
Figures 2, 11:
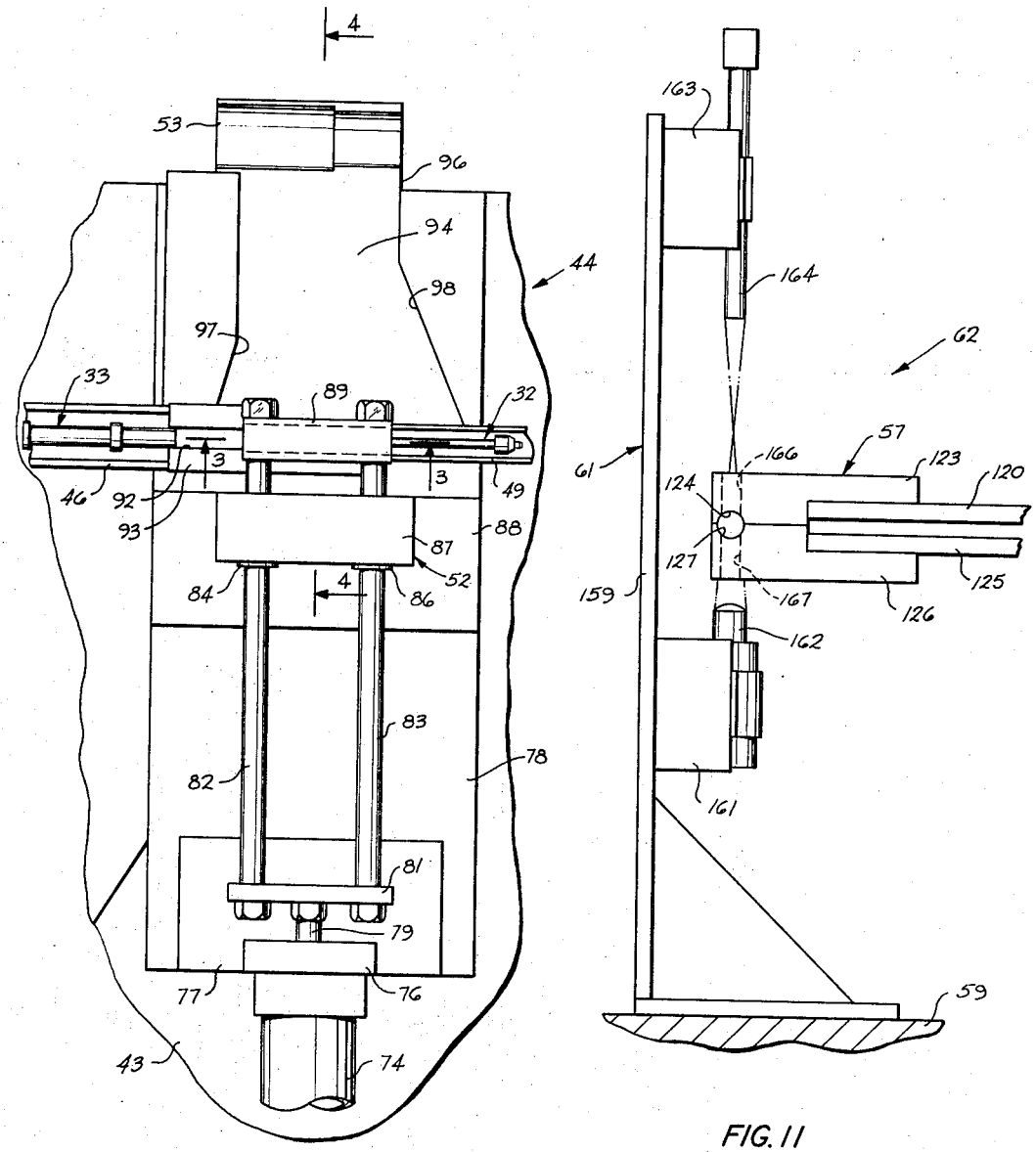
FIG. 2 is a fragmentary plan view of the apparatus of FIG. 1 showing a pin-sleeve transfer mechanism for transferring a pin-sleeve assembly from an assembly station to a transfer nest.
Figure 9:
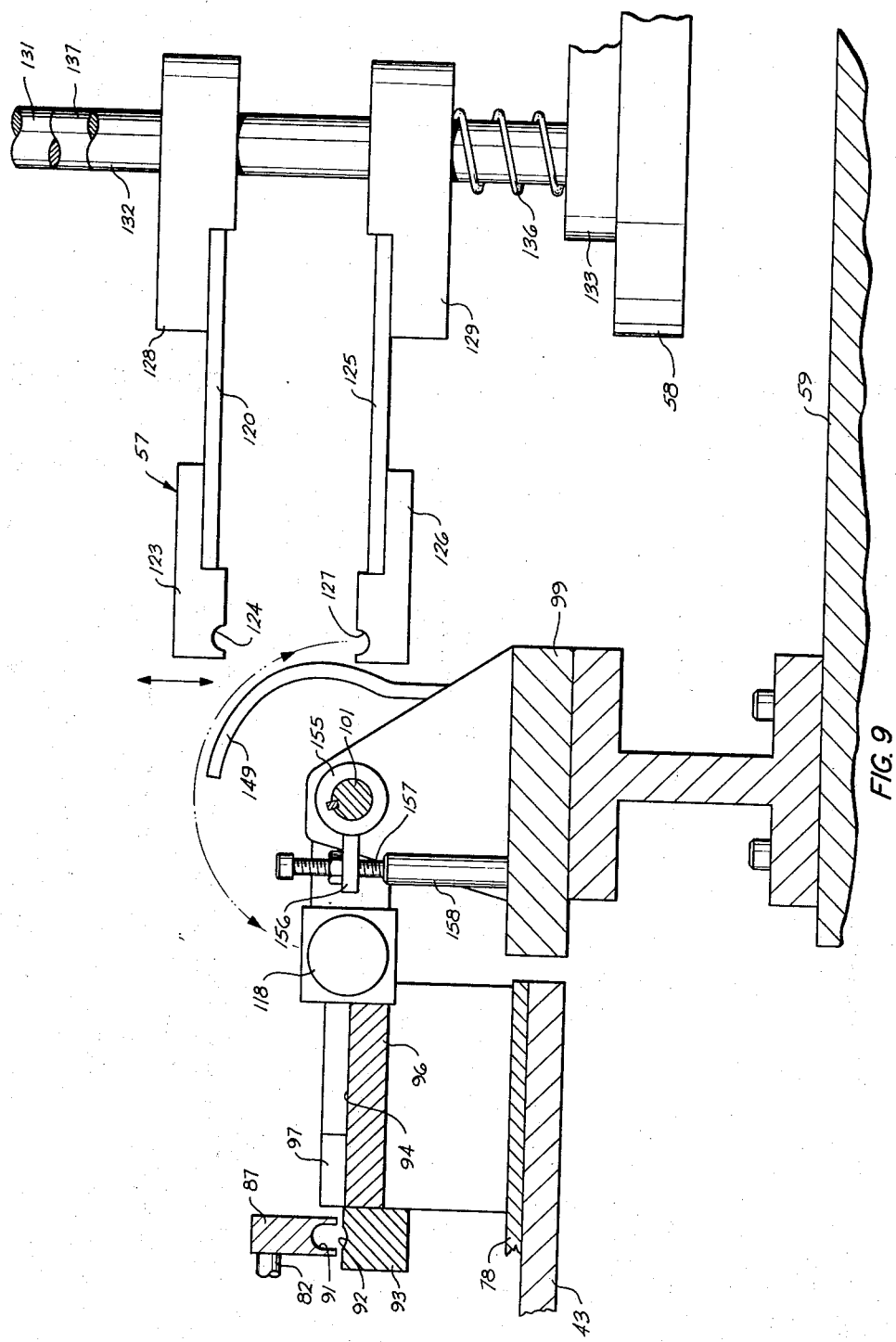
Figure 10:
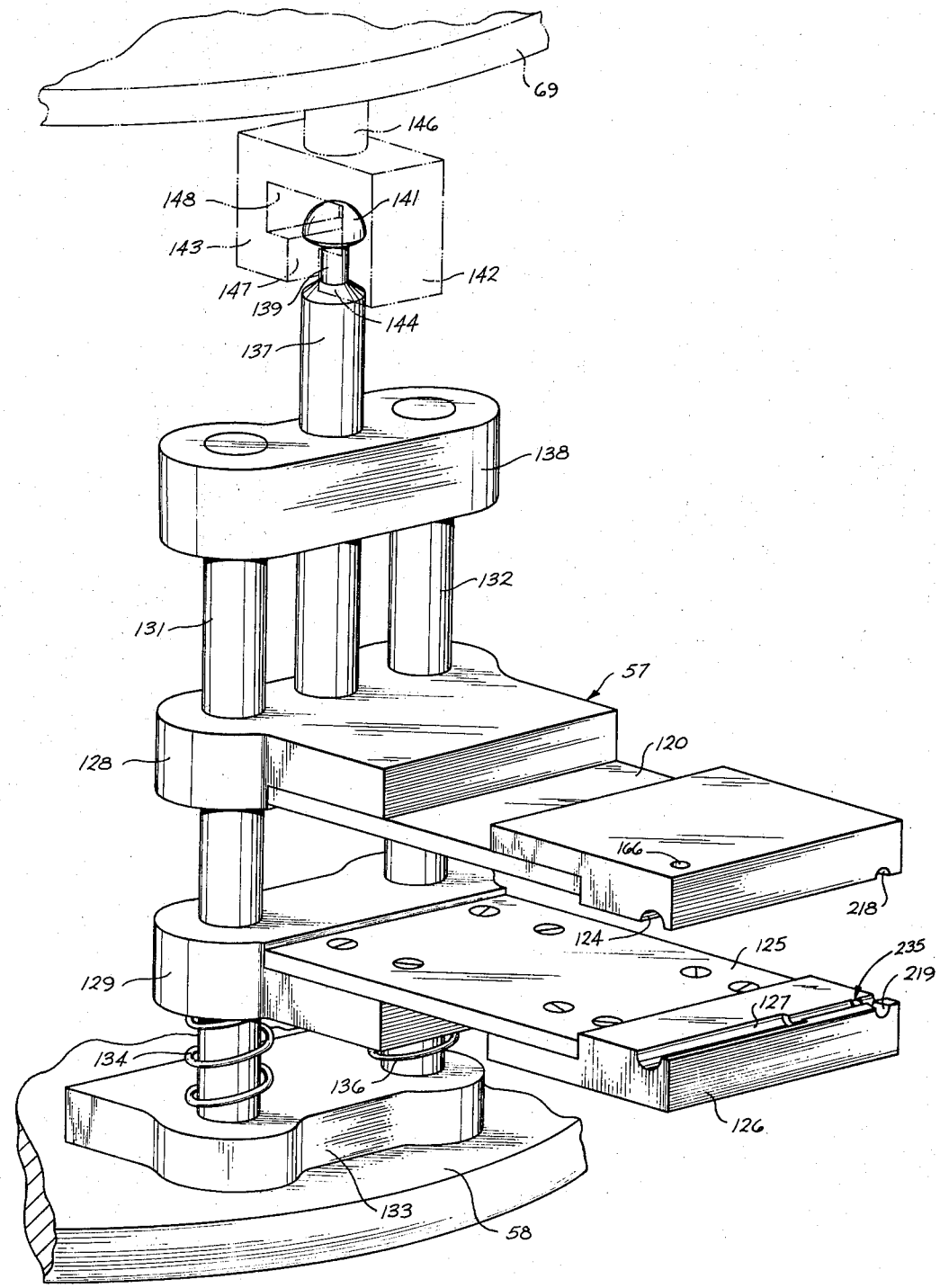
Figure 13:
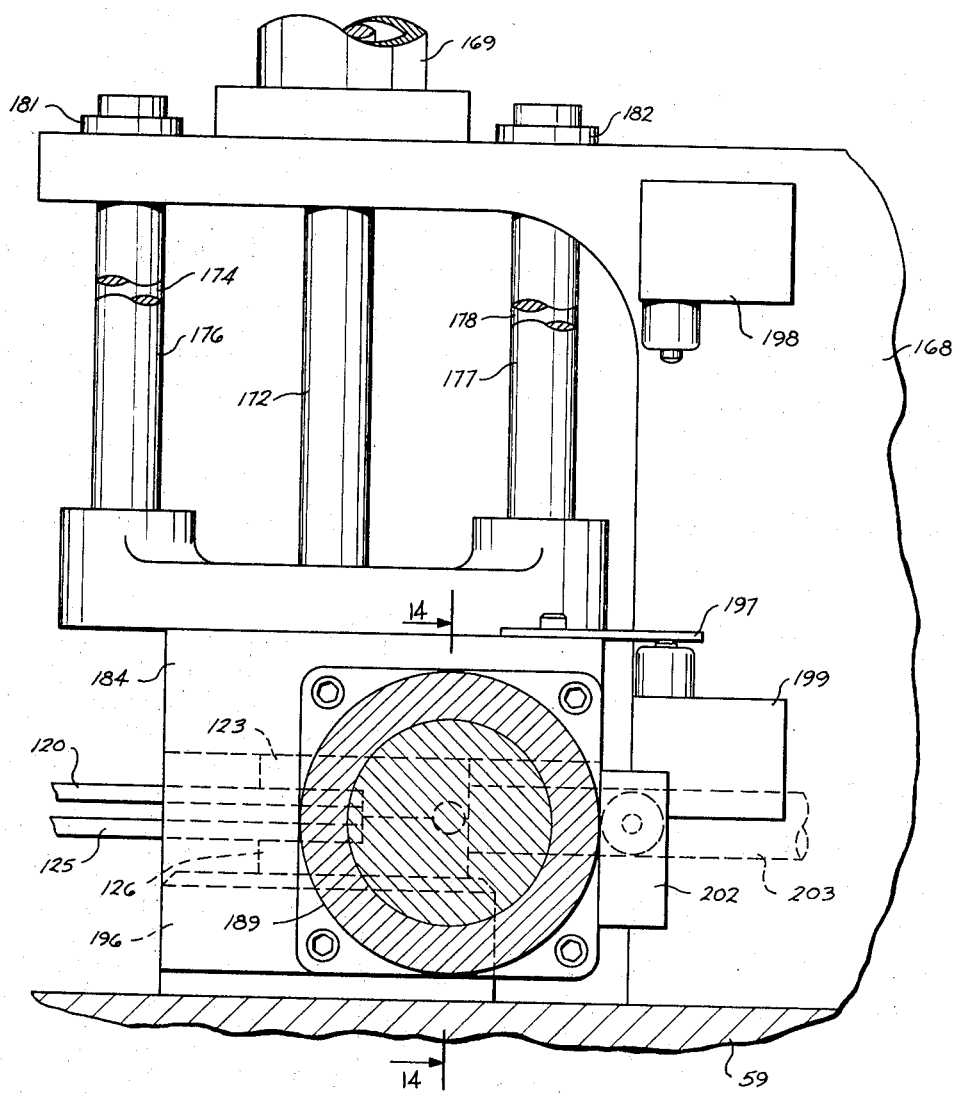

FIG. 9 is an enlarged partial sectional view of the apparatus of FIG. 1, taken along line 9—9 thereof, showing the composite apparatus for transferring the pin-sleeve assembly from the assembly station to the transfer nest and for further transferring the assembly from the nest and thereafter loading the assembly in a separable mold with a camming guide positioned in the path of the assembly during the loading procedure to facilitate proper positioning of the sleeve relative to the pin within the mold;

FIG. 10 is an enlarged perspective view of a portion of the apparatus of FIG. 1 showing a separable mold having a pair of spring-biased mold halves for receiving the pin-sleeve assembly and an overhead mechanism for moving the mold halves together;

FIG. 11 is a vertical view of the apparatus of FIG. 1, taken along line 11—11 thereof, showing a photocell in an inspection station for detecting the absence of a sleeve in the mold to preclude the injection of the insulation compound into the mold in the absence of a sleeve;

FIG. 12 is a vertical view of the apparatus of FIG. 1, taken along line 12—12 thereof, at an injection-molding station, showing an overhead clamping mechanism for seating the mold halves in a clamped position, in alignment with an injection-molding apparatus, and further showing cylinder-controlled plugging and pin-positioning facilities for plugging the ends of the mold die cavities to contain injected insulating compound within the mold and between the pin and sleeve and, further, for gripping opposite ends of the pin to position the pin relative to the sleeve within the mold;

FIG. 13 is a view, taken along line 13—13 of FIG. 12, showing the mold-seating and plugging-positioning mechanisms at the injection molding station;

FIG. 14 is a partial sectional view, taken along line

Figure 19:
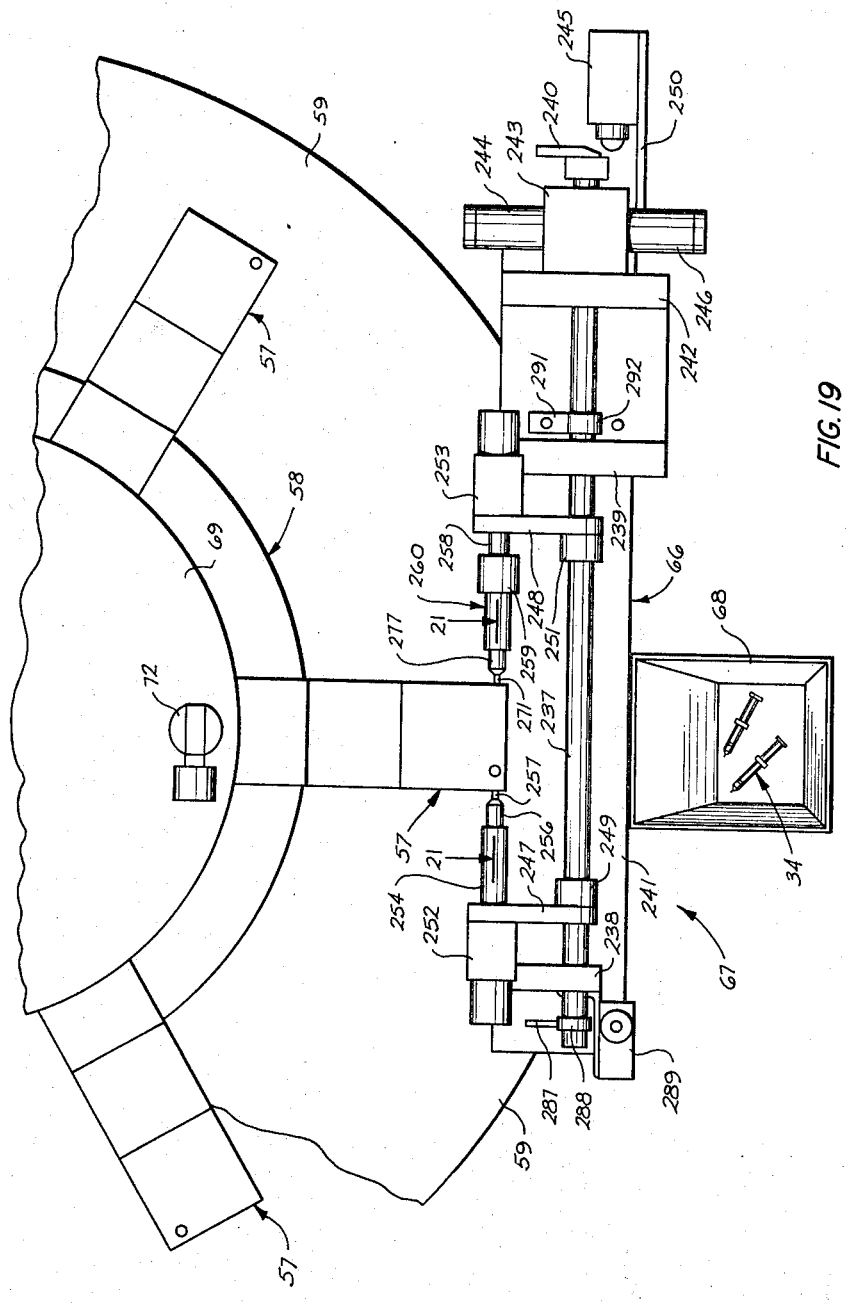
Figure 23:
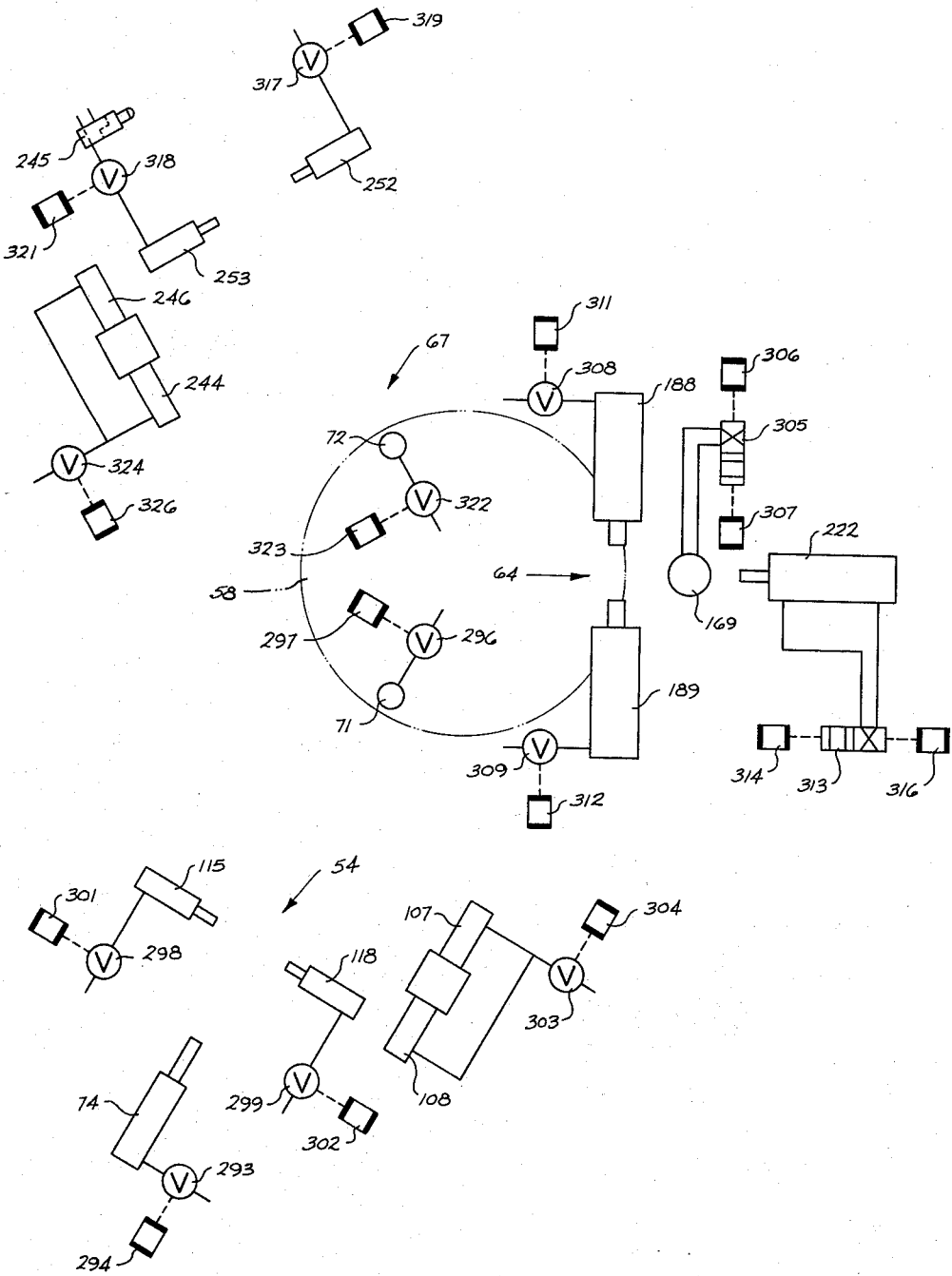
Figure 24:
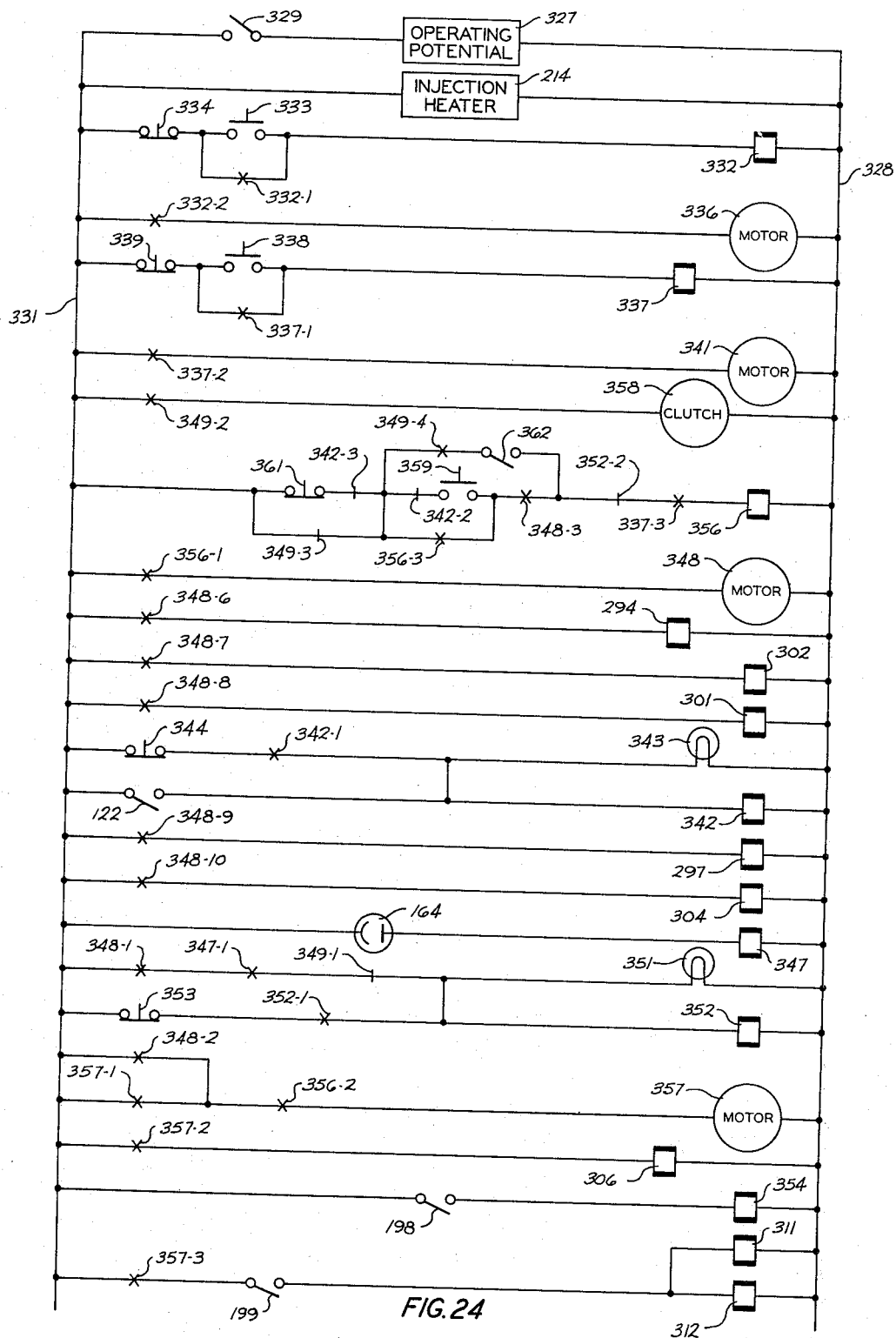
Figure 25:
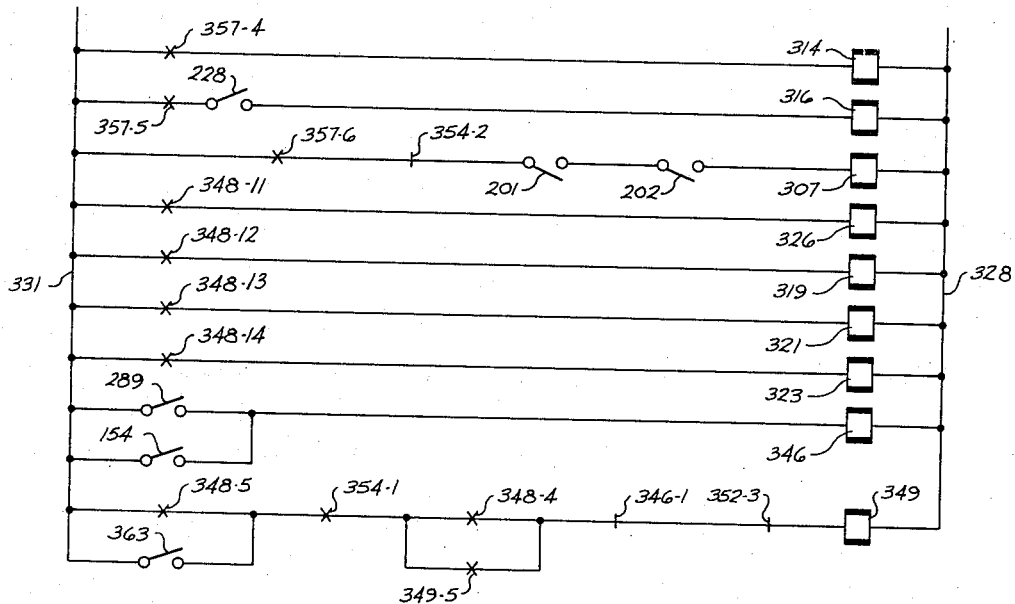
Figure 26:
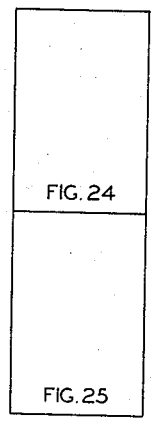

14—14 of FIG. 13, showing the mold plugging and pin-positioning facilities in gripping engagement with opposite ends of the pin to facilitate positioning of the pin within the mold relative to the sleeve;

FIG. 15 is a view of the pin and sleeve assembly in the relative position as supported within the mold prior to the injection of the insulating compound, with a portion of the sleeve broken away to expose a full view of the pin;

FIG. 16 is an enlarged partial sectional view of the apparatus of FIG. 14 to show the mold plugging and pin-positioning facilities in greater detail;

FIG. 17 is a reduced partial sectional view of the apparatus of FIG. 12, taken along line 17—17 thereof, showing the positioning of the injection-molding apparatus relative to the seated and clamped mold to facilitate the injecting of the insulation compound into the mold and between the plug and the sleeve;

FIG. 18 is a fragmentary view of the apparatus of FIG. 17 showing a ram injecting the insulation compound into the mold and between the assembled pin and sleeve in a different operating position;

FIG. 19 is a partial plan view of the apparatus of FIG. 1 showing a transfer unloading mechanism for unloading the completed, insulated plug from the mold;

FIG. 20 is an enlarged partial sectional view, taken along line 20—20 of FIG. 1, showing gripping elements of the transfer-unloading mechanism for gripping and removing the completed, insulated plug from the mold;

FIG. 21 is an enlarged partial sectional view, taken along line 21—21 of FIG. 19, showing the elements of the unloading transfer mechanism in gripping engagement with the completed, insulated plug within the mold;

FIG. 22 is a partial sectional view of the apparatus of FIG. 21 except that the transfer mechanism is in an unloading position with a cull-removing element of one gripping element actuated to cut off the cull and flash remaining from the mold spew;

FIG. 23 is a schematic diagram of the hydraulic control circuit connected to various cylinders used in the apparatus of FIG. 1 for assembling and insulating of the pressure plug;

FIGS. 24 and 25 show an electrical schematic for automatically controlling the operation of the apparatus of FIG. 1, and FIG. 26 is a view showing an arrangement of FIGS. 24 and 25 to display the diagrams of the figures as a single electrical schematic.

Referring now to the drawings, and more particularly to FIG. 1 thereof, there is shown a plug assembly and insulating apparatus, designated generally by the reference numeral 30, which embodies certain principles of the invention. The apparatus 30 is used for automatically inserting a shank 31 (FIG. 15) of a pin, designated generally by the reference numeral 32, within a cylindrical sleeve, designated generally by the reference numeral 33, to form a pin-sleeve assembly, designated generally by the reference numeral 34. A head 36 is formed at one end of the shank 31 of the pin 32. A pointed protrusion 37 extends from the opposite end of the head 36 axially of the pin 31.

The sleeve 33 is provided with an axial passage 38, an intermediate peripheral flange 39, and an end flange 41 at the end of the sleeve opposite from the end which receives the pin shank 31. The pin-sleeve assembly 34 is held in a spaced relationship, as shown in FIG. 15, while an insulating compound 236 is injected into the space between the pin 32 and the sleeve 33 to electrically insulate the pin and the sleeve from each other and to support the plug as a unitary assembly 34. Subsequently, the unitary, insulated, plug-sleeve assembly 34 is machined to form a communications plug for use in telephone switchboard jacks and the like.

Various facilities are provided in the apparatus 30 to precisely locate the pin 32 and the sleeve 33 of each pin-sleeve assembly 34 so that each of the completed, insulated pin-sleeve assemblies 34—34 are a standard length. Further, facilities locate precisely and coaxially the shank 31 of the pin 32 within the passage 38 of the sleeve 33, so that all portions of the peripheral surface of the shank within the passage are equally spaced from the wall of the passage. In addition, as shown in FIG. 15, the portion of the shank 31 which is inserted into the passage 38 of the portion of the wall of the passage adjacent to the inserted shank are formed with helical scores 35 and 40, respectively, so that insulating compound 236 will flow into the scores to secure, upon curing, the pin 31 and the sleeve 33 in the assembled position and preclude relative slipping between the pin and the sleeve.

GENERAL DESCRIPTION

Referring again to FIG. 1, the apparatus 30 includes a first vibratory hopper 42, mounted on a stationary platform 43, for facilitating the feeding of the sleeve 33 (FIG. 15) with the nonflanged end first into an assembly station, generally designated by the reference numeral 44, also supported on the platform 43. A vibratory feed channel 46 is interconnected between the vibratory hopper 42 and the assembly station 44 for feeding successive sleeves 33—33 into the assembly station 44. A conventional escapement mechanism 47 is mounted on the feed channel 46 to ensure that the sleeves 33—33 are fed individually into the assembly station 44.

A second vibratory hopper 48, which is also supported on the platform 43, facilitates the feeding of the pins 32 (FIG. 15) into the assembly station 44 so that the shank 31 enters the assembly station first and is inserted into the sleeve passage 38 at the nonflanged end of the sleeve 33. A vibratory feed channel 49 is interconnected between the vibratory hopper 48 and the assembly station 44 to facilitate the feeding of successive pins 32—32 into the assembly station. A conventional escapement mechanism 51 is mounted on the feed channel 49 to ensure that the pins 32—32 are fed individually into the assembly station 44.

Referring further to FIG. 1, subsequent to the assembly of the pin 32 and the sleeve 33 in the assembly station 44 to form the pin-sleeve assembly 34, a pusher mechanism, designated generally by the reference numeral 52, moves the pin-sleeve assembly from the assembly station into a transfer nest 53 at a loading station, designated generally by the reference numeral 54. Thereafter a transfer-loading mechanism, designated generally by the reference numeral 56, transfers the pin-sleeve assembly 34 from the transfer nest 53 and inserts the assembly into one of a plurality of separable molds, designated generally by the reference numeral 57. Sensing facilities are provided in the transfer loading mechanism 56 for detecting the presence or absence of the pin 32 in the transfer nest 53.

The separable molds 57—57 extend radially from, and are supported by, an indexable turntable, designated generally by the numeral 58. A stationary horizontal table 59 is supported in a vertical stand (not shown) and is positioned adjacent to the periphery of the indexable turntable 58 to support the transfer-loading mechanism 56 at the loading station 54. In addition, the table 59 supports a photocell system, designated generally by the numeral 61, at an inspection station, designated generally by the reference numeral 62, for inspecting the separable molds 57—57 to determine the presence or absence of the sleeve 33 in the mold.

An injection-molding device, designated generally by the reference numeral 63, is positioned adjacent to the periphery of the indexable turntable 58 at an injection-molding station, designated generally by the reference numeral 64. The injection-molding device 63 is used for injecting the insulating compound 236 into the space between the assembled pin 32 and the sleeve 33 within the separable mold 57 and into the scores 35 and 40 of the shank 31 of the pin and the passage wall of the sleeve, respectively.

A transfer-unloading mechanism, designated generally by the reference numeral 66, is supported on the table 59 at an unloading station, designated generally by the reference numeral 67, to facilitate the removal of the insulated pin-sleeve assembly 34 from the separable mold 57 and thereafter deposit the assembly into a receptacle 68.

An additional open station 65 is provided between the injection-molding station 64 and the unloading station 67 to facilitate the curing of the insulating compound 236 injected between the shank 31 of the pin 32 and the passage 38 of the sleeve 33 at the injection-molding station.

An overhead cylinder support 69 is positioned spatially from and supported coaxially above the indexable turntable 58. The support 69 supports two air cylinders 71 and 72, which control the opening and closing of the separable molds 57—57 at the loading station 54 and the unloading station 67, respectively.

ASSEMBLY STATION 44

Pusher mechanism 52

Referring now to FIGS. 2 through 5, the pusher mechanism 52 includes an assembly pusher cylinder 74 extending from one side of, and supported by, a vertical support plate 76. The vertical plate 76 extends upwardly from a mounting support 77 secured horizontally to a pusher-support platform 78, which is mounted on the stationary table 43. A piston rod 79 extends from the cylinder 74 and through the vertical support plate 76 with the free end of the rod being connected centrally to a bridging plate 81. Adjacent ends of a pair of rods 82 and 83 are connected to the bridging plate 81 on opposite sides of the central connection of the piston rod 79. Intermediate portions of the rods 82 and 83 are mounted slidably in bearings 84 and 86, respectively, which are mounted within a bearing support 87. The bearing support 87 extends vertically upwardly from a support mounting 88, which is secured horizontally to the platform 78. A pusher guide 89 is connected to the opposite ends of the rods 82 and 83 and is formed on the underside groove with a passage, designated generally by the reference numeral 91 (FIGS. 3, 4 and 5) which is machined to facilitate the reception of the sleeve 33 and the pin 32 in the guide to form the pin-sleeve assembly 34, as specifically shown in FIGS. 3 and 4.

Referring further to FIG. 2, as the single sleeve 33 moves from the feed channel 46, the nonflanged end of the sleeve 33 is directed initially into the assembly station 44, where the flanged portions of the sleeve are guided into a groove 92 of an assembly support 93 which extends from and vibrates with the feed channel 46. The groove 92 extends from one end of the support 93 to an intermediate point of the support, as viewed in FIG. 3, so that, when the sleeve 33 moves forward and the flange 39 on the sleeve 33 is in engagement with a shoulder formed at the end of the groove 92, the sleeve 33 will be in the desired position under the groove 91 of the guide 89. The pin 32 exits from the end of the feed channel 49 so that the shank 31 of the pin 32 enters the nonflanged end of the sleeve 33, which is positioned on the assembly support 93 within the guide passage 91.

Figure 3:
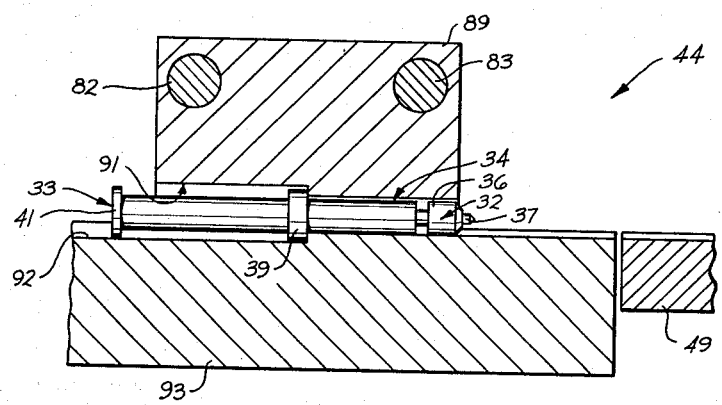
FIG. 3 is an enlarged fragmentary sectional view of the apparatus of FIGS. 1 and 2, taken along line 3—3 of FIG. 2, and showing the pin-sleeve assembly in position at the assembly station.
Figure 4:
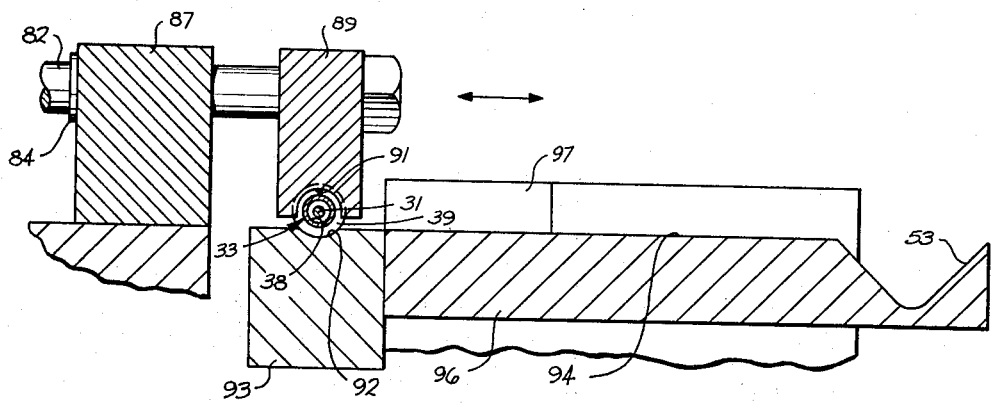
FIG. 4 is an enlarged partial sectional view of the apparatus of FIG. 2, taken along line 4—4 thereof.

As the shank 31 of the pin 32 is inserted into the passage 38 of the sleeve 33, the pin-sleeve assembly 34 is formed as viewed in FIGS. 3, 4 and 15. In this position, the pin-sleeve assembly 34 rests on the assembly support 93 within the passage 91 of the pusher guide 89. Thereafter the pusher cylinder 74 is operated to move the piston rod 79 upwardly, as viewed in FIG. 2, so that the rods 82 and 83 are moved horizontally from a position as viewed in FIG. 4 to a position as viewed in FIG. 5. As the pusher rods 82 and 83 are moved, the pusher guide 89 moves the pin-sleeve assembly 34 from a position above the assembly support 93, along an upper surface 94 of a transfer table 96, and deposits the pin-sleeve assembly 34 in the transfer nest 53 (FIGS. 4 and 5)

Figure 5:
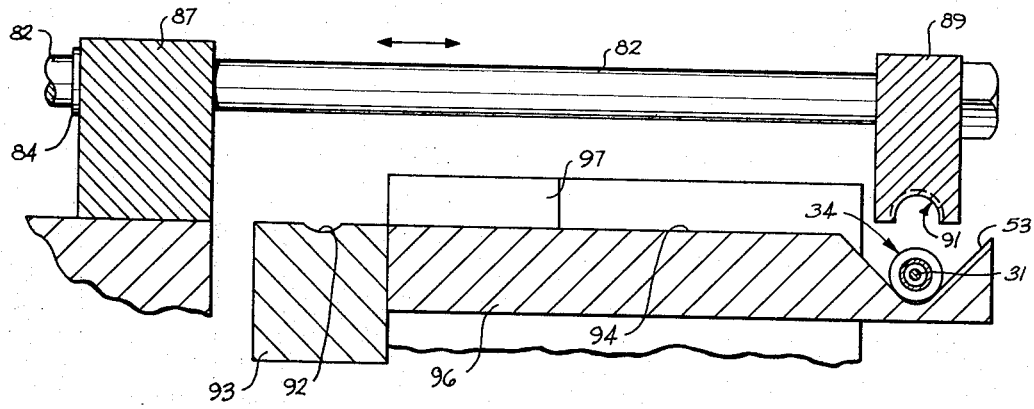
FIG. 5 is a sectional view of the apparatus of FIG. 4 showing the mechanism for transferring the pin-sleeve assembly from the assembly station to the transfer nest in a different operating position.

As viewed in FIGS. 1 and 2, and partially in FIGS. 4 5, the portion of the upper surface 94 of the transfer table 96 over which the pin-sleeve assembly 34 is pushed is confined between opposed diverging walls 97 and 98. In the event the shank 31 of the pin 32 is not sufficiently inserted into the passage 38 of the sleeve 33 and the pin-sleeve assembly 34 is not properly positioned on the assembly support 93, the sleeve and the pin will engage the diverging walls 97 and 98, respectively, to cause relative coaxial movement of the sleeve and the pin so that the shank 31 of the pin is properly inserted within the sleeve and the pin-sleeve assembly 34 is properly positioned for transfer to the loading station 54.

LOADING STATION 54

Transfer loading mechanism 56

Figure 6:
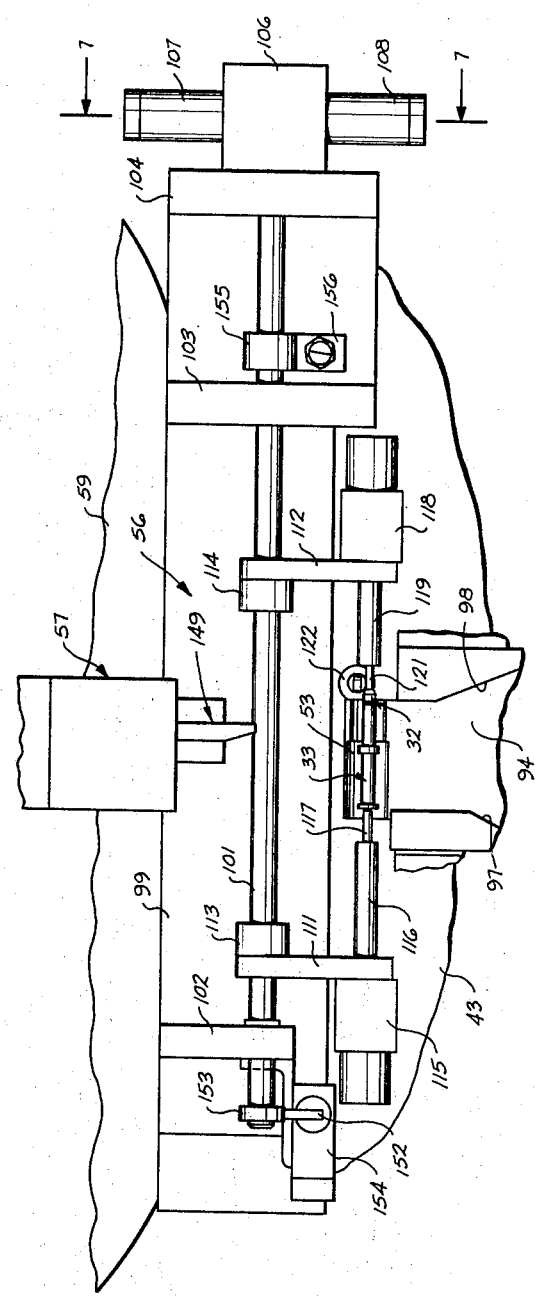
FIG. 6 is a partial plan view showing a transfer-loading mechanism for gripping the pin-sleeve assembly in the transfer nest and thereafter transporting and inserting the assembly in a separable mold.

As shown in FIGS. 1 and 6, the transfer-loading mechanism 56 is supported on a horizontal platform 99 which rests on the stationary table 59. The transfer-loading mechanism includes a rocker shaft 101 which extends through, and is supported for rocking movement within, a pair of vertical bearing plates 102 and 103. The end of the shaft 101, which extends through the bearing plate 103, extends through another vertical bearing plate 104 and is keyed to a pinion 105 (FIG. 7) in a drive housing 106. As further viewed in FIGS. 1, 6 and 7, a pair of air cylinders 107 and 108 control the movement of a pair of racks 109 and 110, respectively, which are positioned in engagement with opposite sides of the pinion 105 for rotating the pinion and, consequently, rocking the shaft 101 in opposite directions.

Referring further to FIGS. 1 and 6, a pair of rocker arms 111 and 112 have formed integrally on common ends thereof cylindrical hub sections 113 and 114, respectively. The cylindrical hub sections 113 and 114 are spatially positioned about and keyed to intermediate portions of the shaft 101 to facilitate rocking movement of the arms 111 and 112, respectively, as the shaft 101 is moved through a partial rotation. The opposite end of the rocker arm 111 supports a transfer gripping cylinder 115 extending from one side thereof and a guide sleeve 116 extending from the opposite side thereof. A piston rod (not shown), extending from the cylinder 115 and into the sleeve 116, is connected to a pin-pickup finger 117, which is designed to slide partially into the sleeve passage 38 from the flanged end of the sleeve 33 to engage the shank end of the pin 32.

A transfer gripping cylinder 118 is secured to one side of the opposite end of the rocker arm 112. A guide sleeve 119 is secured to the opposite side of the end of the rocker arm 112 and is positioned in alignment with the cylinder 118 to receive therein a piston rod (not shown) which extends from the cylinder. The piston rod of the cylinder 118 is connected to a pin-pickup finger 121 with conforming structure on the free end thereof to engage the pin 32 around the protrusion 37 at the head end of the pin. As the cylinder 118 is operated, the finger 121 is moved partially through the sleeve 119 so that the free end of the finger engages the head end of the pin 32.

Subsequent to the deposition of the pin-sleeve assembly 34 into the transfer nest 53 by the pusher guide 89, as viewed in FIGS. 5 and 6, the cylinders 115 and 118 are operated to move the pin-pickup fingers 117 and 121 into engagement with respective ends of the pin 32 to grip the pin therebetween. It is noted that the sleeve 33 is held loosely with the gripped assembly due to the insertion of the finger 117 within the sleeve passage 38 at the flanged end of the sleeve and further due to the insertion of the shank 31 of the pin 32 into the opposite end of the sleeve.

A limit switch 122 (FIGS. 6 and 24) is positioned in the path of movement of a cam (not shown) formed on the pin-pickup finger 121. In the event the pin 32 is missing from the pin-sleeve assembly 34, the finger 121 travels a sufficient distance towards the transfer nest 53 to operate the switch so that operating potential for the apparatus 30 is removed from a control circuit (FIGS. 24 and 25 to indicate the missing pin.

Molds 57

As viewed in FIGS. 9 and 10, the separable molds 57 include an upper die section 123 having a die cavity 124. The surface of the die cavity 124 is complementary to the adjacent surface of the pin-sleeve assembly 34 (FIG. 15). The mold 57 also includes a lower die section 126 having a cavity 127 (FIG. 16) with a surface complementary to the configuration of the adjacent portion of the pin-sleeve assembly 34. The die sections 123 and 126 are secured to free ends of a pair of support arm 120 and 125, respectively. The opposite ends of the arms 120 and 125 are secured to a pair of vertical slides 128 and 129, respectively, which, in turn, are mounted for sliding movement on a pair of vertical rods 131 and 132. The rods 131 and 132 element upwardly from a rod-mounting support 133, which is secured to the upper surface of the indexable turntable 58. A pair of compression springs 134 and 136 are positioned about the rods 131 and 132, respectively, between the slide 129 and the support 133 to facilitate the resilient positioning of the lower die section 126 in a position for receiving the pin-sleeve assembly 34 transferred from the transfer nest 53.

A lifting rod 137 is secured to the upper surface of the slide 128, centrally between the openings of the slide, which facilitates sliding movement about the rods 131 and 132. The lifting rod 137 extends through a central opening in a rod guide block 138, which is secured fixedly to the upper ends of the rods 131 and 132. The upper end of the lifting rod 137 extends above the rod guide block 138, and is formed with a reduced portion 139 and a head 141.

During the portion of the cycle when the indexable turntable 58 is moving, the upper die section 123 rests upon the lower die section 126, and the cavities 124 and 127 of the die sections 123 and 126, respectively, cooperate to form a molding cavity. It is noted that, even though the upper die section 123 is resting upon the lower die section 126, the lower die section maintains a level substantially as shown in FIGS. 9 and 10 due to the biasing action of the compression springs 134 and 136.

A yoke 142, having inwardly turned opposed ends 143 and 144, as shown in phantom in FIG. 10, is connected to the free end of a piston rod 146 which extends from the air cylinder 71 (FIG. 1) and through the overhead support 69. During the period when the indexable turntable 58 is moving, the air cylinder 71 is controlled to position the yoke 142 in a downward position in alignment with the reduced section 139 and the head 141 of the lifting rod 137, which is also in the lowermost position with the upper die section 123 resting on the lower die section 126. As the mold 57 approaches a position beneath the yoke 142, the reduced section 139 of the lifting rod 137 moves into a spacing 147 formed between the opposed yoke ends 143 and 144, and the head 141 of the lifting rod moves into an opening 148 formed centrally by the yoke. Thereafter the air cylinder 71 is actuated to move the yoke 142 upwardly to a position as shown in FIG. 10, so that the lifting rod 137 is moved slidably upwardly through the rod guide block 138. As the rod 137 is moved upwardly, the slide 128 and the associated upper die section 123 is raised to expose the die cavity 127 in the lower die section 126 in anticipation of the insertion of a pin-sleeve assembly 34 into the die cavity.

Transfer loading

Referring now to FIGS. 1 and 6 through 10, as the die sections 123 and 126 are separated to expose the die cavity 127 of the lower die section 126, the cylinders 116 and 118 are operated to move the pin-pickup fingers 117 and 121, respectively, into engagement with opposite ends of the pin 32. It is noted that the pickup finger 117 extends into the passage 38 of the sleeve from the flanged end thereof and into engagement with the shank end of the pin 32. The pickup finger 121 moves into engagement with the head 36 of the pin 32 and surrounds the protrusion 37 of the pin. In this manner the sleeve 33 is supported loosely about a portion of the pickup finger 117 and the shank 31 of the pin 32 so that the sleeve is carried loosely with the gripped pin as the pickup fingers 117 and 121 pivot from the transfer nest 53 and deposit the pin-sleeve assembly 34 in the die cavity 127 of the lower die section 126.

Figure 7:
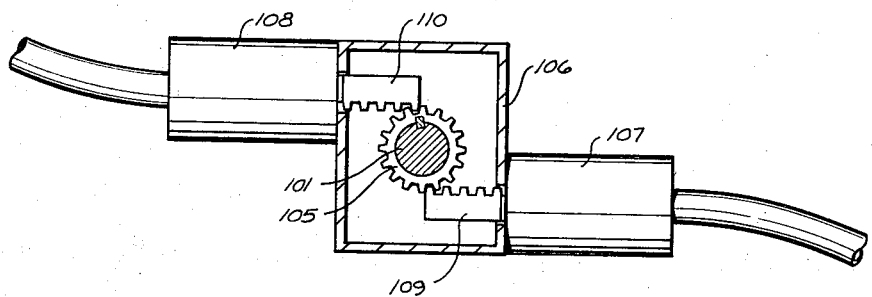
FIG. 7 is an enlarged sectional view of the apparatus of FIG. 6, taken along line 7—7 thereof, showing a rack and pinion mechanism for operating the transfer-loading mechanism.

Subsequent to the gripping of the pin 32 by the pickup fingers 117 and 121, the cylinders 107 and 108 are operated to move the racks 109 and 110, respectively, so that the pinion 105 is rotated counterclockwise, as viewed in FIG. 7. Since the pinion 105 is keyed to the shaft 101, the shaft will rotate with the pinion thereby pivoting the rocker arms 111 and 112 about the axis of the shaft so that the pin-sleeve assembly 34 is transported from the transfer nest 53 and is inserted into the die cavity 127 of the lower die section 126.

Figure 8:
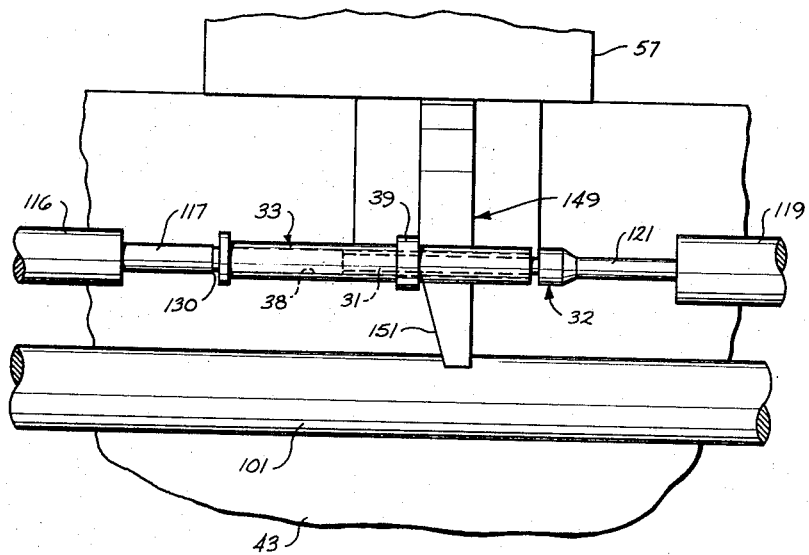
FIG. 8 is an enlarged partial plan view of FIG. 6, showing the transfer-loading mechanism moving the pin-sleeve assembly so that a center flange of the loosely held sleeve engages a camming guide to facilitate positioning of the sleeve relative to the gripped pin prior to the inserting of the assembly into a complementary mold cavity.

As particularly viewed in FIGS. 6, 8 and 9, a camming guide, designated generally by the reference numeral 149, extends from and is supported by the horizontal platform 99 (FIG. 9) and is formed with a tapered free end 151 (FIG. 8) for engaging the intermediate flange 39 of the sleeve 33. As the pin-sleeve assembly 34 is transported from the transfer nest 53 and inserted into the die cavity 127 of the lower die section 126, the sleeve 33 which is loosely carried with the gripped pin, will slide axially over the pin as the intermediate flange 39 engages the camming guide 149 so that the sleeve is properly positioned with respect to the gripped pin 32 prior to the insertion of the pin-sleeve assembly 34 within the die cavity 127 of the lower die section 126.

Referring to FIG. 6, as the shaft 101 is rotated to facilitate the transporting of the pin-sleeve assembly 34 from the transfer nest 53 and inserting the assembly into the die cavity 127 of the die section 126, an actuator finger 152 extending from a collar 153, which is secured to the end of the shaft, becomes disengaged with a switch 154 which conditions a turntable control circuit to preclude movement of the indexable turntable 58 during the transfer loading procedure. In this manner, the indexable turntable 58 is precluded from moving during the period when the transfer-loading mechanism 56 is in operation to transfer the pin-sleeve assembly 34 from the transfer nest 53 and insert the assembly into the mold 57.

As illustrated in general in FIG. 6 and in greater detail in FIG. 9, a collar 155 is keyed to the shaft 101 for rotational movement therewith and supports a flat plate 156 which extends radially therefrom. An adjustable stop pin 157 extends from the plate 156. A stationary stop rod 158 is supported by and extends vertically from the horizontal platform 99 with the uppermost end of the rod positioned in the path of movement of the stop pin 157.

Subsequent to the insertion of the pin-sleeve assembly 34 into the die cavity 127 of the lower die section 126, the cylinders 115 and 118 (FIG. 6) are operated to withdraw the pickup fingers 117 and 121, respectively, from gripping engagement with opposite ends of the pin 32. Thereafter, the air cylinders 107 and 108 (FIGS. 6 and 7) are operated to rotate the shaft 101 so that the transfer-loading mechanism 56 is moved to a position as viewed in FIGS. 1 and 6. As the transfer loading mechanism 56 approaches the position as viewed in FIGS. 1 and 6, the stop pin 157 (FIG. 9) engages the stop rod 158 to preclude possible continued movement of the transfer loading mechanism and to properly position the pickup fingers 117 and 121 for a subsequent pin-gripping operation. In addition, the actuator finger 152 closes the switch 154 to condition the circuit which controls movement of the indexable turntable 58. It is noted that the closing of the switch 154 does not necessarily operate the turntable control circuit but rather conditions the circuit to permit the table to be moved upon operation of other controlling features.

INSPECTION STATION 62

Subsequent to the insertion of the pin-sleeve assembly into one of the molds 57—57 at the molding station 54, the turntable 58 is indexed to move the particular mold, which just received the pin-sleeve assembly 34 at the loading station 54, into the inspection station 62.

As shown in FIG. 11, the inspection station 62 includes a vertical stand 159 which is supported on the table 59. A lamp support 161 is mounted on the vertical stand 159 and supports a lamp 162. A photocell support 163 is mounted on the vertical stand 159 above the lamp support 161 and supports a photocell 164 coaxially with the lamp 162. A pair of aligned apertures 166 and 167 (FIGS. 11, 14 and 16) are formed vertically through the die sections 123 and 126, respectively, and are contiguous with the die cavities 124 and 127. The apertures 166 and 167 are aligned to facilitate the passage of a light beam therethrough in the event the sleeve 33 is missing. If the sleeve 33 is missing in the cavity of the mold 57, the illumination from the lamp 162 actuates the photocell 164 to control a circuit which precludes continued operation of the apparatus 30. An operator views the shut down of the apparatus 30 and locates the problem area of the missing sleeve 33 so that the problem may be corrected. The operator manually raises the upper die section 123 and inserts the sleeve 33 into the die cavity 127 of the lower die section 126 to complete the pin-sleeve assembly 34. When the sleeve 33 is inserted into the die cavity 127, the illumination from the lamp 162 is blocked from the photocell 164, and the control circuit for the apparatus 30 is conditioned for subsequent operation.

INJECTION MOLDING STATION 64

As viewed in FIGS. 12 and 13, the injection molding station 64 includes a vertical stand 168 which is positioned on the table 59. A frame-positioning and seating cylinder 169 is supported on the upper surface of a horizontal shelf 171 which extends from the stand 168. A piston rod 172 extends downwardly from the cylinder 169 through an opening in the shelf 171 and is secured at the free end thereof to a guide support 173. Four guide rods 174, 176, 177 and 178 (FIGS. 1, 12 and 13) extend upwardly from and are secured to cylindrical projections formed on the support 173. The upper ends of the rods 174, 176, 177 and 178 extend through openings in the shelf 171 and through bearings 179, 181, 182 and 183, respectively, so that when the cylinder 169 is operated to move the piston rod 172 the guide support 173 is moved accordingly and the rods slide through the bearings.

As particularly viewed in FIGS. 12 and 13, the guide support 173 is secured to a frame 184 having vertically depending portions 186 and 187 for supporting plug-control cylinders 188 and 189, respectively. Piston rods 191 and 192 extend from the cylinders 188 and 189, respectively, through openings in the portions 186 and 187, respectively, of the frame 184. The piston rod 191 supports a shank 193 having a plug 232 (FIGS. 14 and 16) formed on the free end thereof. The plug 232 is insertable into one end of the mold cavity formed by the mating die cavities 124 and 127 of the die sections 123 and 126, respectively. The piston rod 192 supports a shank 194 having a plug 234 (FIGS. 14 and 16) which is insertable into the opposite end of the mold cavity formed by the die cavities 124 and 127.

As shown in FIG. 16, the free end of the plug 234 is formed with a reduced section 220 and a seat 225 axially disposed in the end thereof. The seat 225, formed axially in the free end of the plug 234 is designed to locate precisely and coaxially the shank 31 of the pin 32 within the passage 38 of the sleeve 33. In addition, the reduced end portion 220 of the plug 234 facilitates the injection of the insulating compound 236 against the walls of the passage 38 of the sleeve 33 beyond the free end of the shank 31 of the pin 32.

A seat 196 is mounted on the stationary platform 59 for facilitating the proper positioning and seating of the mold 57 during the injection molding procedure.

During the period when the turntable 58 is indexing, the cylinder 169 is controlled to maintain the frame 184 in the upper position, as shown partially in phantom in FIG. 12. In addition, the cylinders 188 and 189 are controlled to maintain the plugs 232 and 234, respectively, in withdrawn positions.

A switch actuator 197 is mounted on the upper surface of the frame 184 and projects laterally thereof. The actuator 197 is positioned to engage and close a limit switch 198 when the frame is in the upper position. The switch 198 is in a circuit which controls the indexing movement of the turntable 58. Whenever the frame 184 is in the lower position as shown in FIGS. 12 and 13, the switch 198 is opened which precludes the operation of the turntable control circuit.

In addition, a switch 199 (FIG. 13) is positioned in the path of travel of the actuator 197 as the frame 184 moves to the lower position so that the switch 199 is closed when the frame is in the lower position. The switch 199 is in a circuit which controls the operation of the cylinders 188 and 189. When the frame 184 is in the upper position or is moving between the upper and lower positions, the switch 199 is open to preclude the operation of the cylinders 188 and 189 which, in turn, prevents the movement of the plugs 232 and 234 (FIGS. 14 and 16) towards each other. The control of the switch 199 precludes the possibility of damage to the plugs 232 and 234 during movement of the frame 184.

In addition, a pair of switches 201 and 202 (FIG. 12) are mounted on the frame 184 and are controlled by cams (not shown) which are mounted on the piston rods 191 and 192, respectively. The switches 201 and 202 preclude the possibility of the raising of the frame 184 during the period when the plugs 232 and 234 are inserted into opposite ends of the mold cavity. The switches 201 and 202 are in a circuit for controlling the operation of the cylinder 169. When the piston rods 191 and 192 are moved to insert the plugs 232 and 234, respectively, into the mold cavity, the switches 201 and 202 are opened to preclude upward movement of the frame 184, thereby precluding the possibility of damage to the plugs.

Injection molding device 63

Referring to FIGS. 17 and 18, the injection molding device 63 includes a heating and melting chamber 203 having a funnel 204 projecting upwardly from one end thereof in alignment with a plastic pellet feed hopper 206 for facilitating the feeding of plastic pellets into a bore 207 of the chamber. The chamber 203 is supported on a pair of slides 208 and 209 which are mounted slidably on slide support rods 211—211. The rods 211—211 are supported at the opposite ends thereof by vertical supports 212 and 213 which extend upwardly from the stationary table 59.

An electrical heating unit 214 is positioned around an intermediate portion of the chamber 203 to heat the chamber so thaa the plastic pellets are melted into a workable state. The chamber 203 is formed at one end thereof with a nozzle 216 having an opening 217 which is positioned in alignment with half-spew slots 218 and 219 of the die sections 123 and 126, respectively, which form a spew opening 221 when the die sections are brought together as shown in FIGS. 17 and 18.

A ram-control cylinder 222 is mounted on a stand 223 extending upwardly from the stationary table 59 and supports a piston rod 224 extending therefrom towards and axially in alignment with the bore 207 of the chamber 203. The piston rod 224 extends through an axial opening 226 in the end of the chamber 203 opposite to the end of the chamber from which the nozzle projects. A ram 227, having a shape which conforms to the cross-sectional area of the bore 207 of the chamber 203, is secured to the free end of the piston rod 224 and is positioned within the cylindrical bore 207 of the chamber 203 to move the plastic pellets from a position beneath the funnel 204 into a position surrounded by the heating element 214 and further towards the nozzle opening 217.

As viewed in FIGS. 17 and 18, a torpedo-shaped element 205 is positioned intermediately within the bore 207 of the chamber 203 and is suspended from the walls of the bore by a series of radially extending webs 210. The torpedo element 205 facilitates the movement of the plastic pellets between the element and the walls of the bore 207 so that the pellets are passed adjacent to the area surrounded by the heating unit 214. In this manner, essentially all of the pellets are subjected to a sufficient temperature to melt the pellets.

A switch 228 is suspended from a support 229 extending upwardly from the horizontal platform 59 and is positioned to be controlled by a cam 231 formed on the piston rod 224. Initial operation of the air cylinder 222 is controlled by a sequential timer. As the piston rod 224 moves to the left from a position as shown in FIG. 17 to a position as shown in FIG. 18, the switch 228, which is in a circuit for controlling the application of operating pressure to the cylinder 222 to return the cylinder to the position as viewed in FIG. 17, is closed. When the air cylinder 222 is operated to move the ram 227 to the rear of the bore 207, the injection cycle is reversed and the piston rod 224 is returned to the position shown in FIG. 17, whereby the cam 231 opens the switch 228. As the switch 228 is opened, the operating pressure for the reverse cycle of the cylinder 222 is removed and the cylinder ceases to move the piston rod 224.

*Injection molding procedure*

Subsequent to the insertion of the pin-sleeve assembly 34 within the die cavity 127 of the lower die section 126, as viewed in FIGS. 9 and 10, the air cylinder 71 (FIG. 1) is operated to move the upper die section 123 into engagement with the lower die section 126 so that the pin-sleeve assembly is captured within the mold cavity formed by the upper and lower die cavities 124 and 127, respectively. Thereafter, the turntable 58 is indexed to move the particular mold 57 with the pin-sleeve assembly therein to the sleeve inspection station 62 (FIG. 11) and subsequently into the injection molding station 64, as shown in FIGS. 12, 13, 14, 17 and 18.

Due to the biasing action of the compression springs 134 and 136 (FIG. 10), the closed mold 57, which includes the die sections 123 and 126, is positioned spatially above the rod mounting support 133. Further, the frame 184 (FIGS. 12, 13 and 14) is in the upper position to permit the mold 57 to move into the injection molding station 64 without encountering any obstructions. The turntable 58 is indexed to a position which facilitates the positioning of the mold 57 spatially above the seat 196 and spatially beneath the frame 184.

Thereafter, the cylinder 169 (FIGS. 12 and 13) is operated to move the frame 184 downwardly so that the underside of the frame engages the upper surface of the die section 123 and pushes the mold 57 downwardly against the biasing action of the springs 134 and 136 and seats the underside of the die section 126 on the upper surface of the seat 196. As the mold 57 rests upon the seat 196, the end openings of the mold cavity formed by the die cavities 124 and 127 are aligned with the plugs 232 and 234, respectively, on the shanks 193 and 194, respectively, (FIGS. 12, 14 and 16). In addition, the spew 221 formed by the spew slots 218 and 219 (FIGS. 10 and 17) of the die sections 123 and 126, respectively, is positioned in alignment with the nozzle 216 extending from the chamber 203.

Referring now to FIGS. 12, 14 and 16, subsequent to the seating of the mold 57 between the seat 196 and the frame 184, the cylinders 188 and 189 are operated to move the piston rods 191 and 192, respectively, outwardly from the cylinders towards each other. As the piston rods 191 and 192 are moved towards each other, the plugs 232 and 234, respectively, are moved towards the mold cavity openings formed by the mating die cavities 124 and 127.

As shown in FIGS. 14 and 16, the free end of the shank 193 is formed with the axially extending plug 232 having a cavity 233 with a shape complementary to the head 36 and the projection 37 of the pin 32. In addition, the outside diameter of the plug 232 is slightly less than the diameter of the mold cavity to facilitate sliding movement of the plug into the cavity. The free end of the shank 192 is formed with the axially aligned reduced plug 234 having an outside diameter slightly less than the diameter of the passage 38 of the sleeve 33 to facilitate sliding entry of the plug into the passage as shown in FIG. 16. In addition, the diameter of the shank 192 is slightly less than the diameter of the mold cavity to facilitate sliding movement of the shank into the cavity.

As the plug 232 of the shank 193 enters the mold cavity, as shown in FIG. 16, the complementary shaped cavity 233 of the plug engages the projection 37 and the head 36 of the pin 32. As the shank 193 continues to move towards the mold 57, the head 36 of the pin 32 is bottomed against a shoulder 230 which forms one side of an annular protrusion, designated generally by the reference numeral 235, extending into the die cavities 124 and 127 of the die sections 123 and 126, respectively, after the separable sections are moved together to form the mold. In this manner, the pin 32 is positioned precisely within the cavity of the mold 57.

As viewed in FIG. 16, the plug 234 is formed with a head 185 at one end thereof. The head 185 of the plug 234 is positioned within a chamber 190 formed in the end of the shank 194. A compression spring 195 is also positioned within the chamber 190 of the shank 194 so that the plug extends biasingly from the end of the shank. As the plug 234 of the shank 194 enters the opposite end of the mold cavity and passes into the passage 38 of the sleeve 33, the seat 225 of the plug engages the free end of the shank 31 of the pin 32 so that the pin is gripped and positioned between the plug 232 and the plug 234 and is bottomed against the protrusion shoulder 230. The shank 194 continues to move into the mold cavity opening at the sleeve end and subsequently engages the flange 41 of the sleeve 33 and moves the nonflanged end of the sleeve into engagement with a shoulder 250, which forms the other side of the protrusion 235, to facilitate proper positioning of the sleeve within the mold cavity. As the shank 194 moves into the mold cavity subsequent to the engagement of the shank 31 of the pin 32 by the plug 234, the shank 194 compresses the spring 195 and slides over the rearward portion of the plug to increase the gripping pressure of the plug upon the shank 31. The plugs 232 and 234 grip and properly position the pin 32 within the mold cavity in spaced relation to the sleeve 33. The shank 194 engages and properly positions the sleeve 33 within the cavity so that the pin 32 and the sleeve are supported spatially in a position as shown in FIGS. 14, 15 and 16.

As the plugs 232 and 234 cooperate to locate precisely and coaxially the pin 32 relative to the annular protrusion 235, and the shank 194 locates precisely the sleeve 33 relative to the protrusion, the spacing between the head 36 of the pin and the nonflanged end of the sleeve is formed precisely on opposite sides of the annular protrusion. The space between the head 36 of the pin 32 and the nonflanged end of the sleeve 33 is adjacent to the spew 221 (FIGS. 17 and 18) to facilitate the injection of the insulating compound 236 into the space, and further into the space between the shank 31 of the pin and the adjacent walls of the passage 38 of the sleeve.

In addition, as previously noted and as viewed in FIG. 16, the reduced end portion 220 of the plug 234 facilitates the injection of the insulating compound 236 beyond the free end of the shank 31 to form an insulation skirt to ensure and facilitate the insulation of the end of the shank from the walls of the passage 38 of the sleeve 33. By utilizing the arrangement which includes the plugs 232 and 234 extending from the shanks 193 and 194, respectively, and cooperating with the shoulders 230 and 250, respectively, of the annular protrusion 235, the positioning of each of the pin-sleeve assemblies 34—34 within the mold cavities of the molds 57—57 is precise to provide completed, insulated assemblies of a standard length.

In addition, the pin-locating features, which includes the seat 220 of the plug 234, facilitate the locating precisely and coaxially of the shank 31 of the pin 32 within the passage 38 of the sleeve 22 to ensure that each and every portion of the shank is equally insulated from the sleeve by the insulating compound 236. It is further noted that the head 36 of the pin 32 and the sleeve 33 engage the shoulders 230 and 250, respectively, of the protrusion 235 to form seals which preclude the outflow of the workable insulating compound during the injection molding procedure. In addition, the plug 234 is utilized as an end closure for the cavity which receives the injected insulating compound 236, and thereby precludes the outflow of workable insulating compound from the cavity during the injection molding procedure.

As previously discussed, the plug 234 forms a closure in the flanged end of the sleeve 33 to preclude the outflow of insulating compound 236 which will be injected into the space between the pin 32 and the sleeve. The head 36 of the pin 32 and the nonflanged end of the sleeve 33 form a seal with the cavity protrusion 235 to preclude the outflow of the insulating compound from the opposite end of the mold cavity thereby facilitating the injection and flowing of insulating compound 236 around the shank 31 and within the portion of the passage 38 which spatialy surround the pin shank to insulate and spatially support the pin from the sleeve. An additional amount of the insulating compound 236 flows between the nonflanged end of the sleeve 33 and the surface of the head 36 of the pin 32 which is contiguous with the shank 31. Further, the insulating compound also flows into the helical scores 35 and 40 of the shank 31 of the pin 32 and the wall of the passage 38 of the sleeve 33 so that, upon curing of the compound, the pin is secured with and insulated from the sleeve.

Referring now to FIGS. 17 and 18, as the mold 57 is properly seated on the platform 196 and held in that position by the frame 184, the cylinder 222 is operated to move the piston rod 224 to the left. As the piston rod 224 moves to the left, the ram 227 moves towards the plastic pellets which are deposited from the hopper 226, through the funnel 204, into the chamber bore 207. As the plastic pellets are moved by the ram 227 into the heated area between the torpedo element 205 and the adjacent walls of the bore 207, which is surrounded by the heating element 214, the plastic pellets are melted into a workable state to form the flowable plastic compound 236.

Continued movement of the ram 227 to the left, as viewed in FIGS. 17 and 18, forces the workable compound 236 into the nozzle end of the chamber bore 207. Subsequently, the workable insulating compound 236 is compacted in the nozzle end of the chamber bore 207 where it would appear that the compound would flow out of the nozzle opening 217. However, the pressure exerted upon the workable compound 236 by the ram 237 is insufficient to force the compound out through the nozzle opening 217 and the chamber 203 moves towards the seated mold 57 through the sliding movement of the slides 208 and 209 on the slide rods 211. Subsequently, the chamber nozzle 216 is inserted into the mold spew 221, as viewed in FIG. 18, whereafter continued movement of the ram 227 to the left forces the workable plastic compound 236 from within the chamber bore 207 through the nozzle opening 217, through the mold spew 221 and into the space between the passage 38 of the sleeve 33 and the shank 31 of the pin 32, as shown in FIG. 16.

Subsequent to the injection of the workable compound 236 into the mold 57, the cylinder 222 is controlled to move the ram 227 to the right from a position as viewed in FIG. 18. The rearward surface of the ram 227 subsequently engages the funnel end of the chamber bore 207 and moves the chamber 203 towards the cylinder 222 to a position as viewed in FIG. 17. The cylinders 188 and 189 are thereafter operated to withdraw the plugs 232 and 234 from within the mold cavity openings of the mold 57.

Subsequently, the cylinder 169 is operated to move the frame 184 (FIGS. 12, 13 and 14) to the upper position whereafter the compression springs 134 and 136 (FIG. 10) urge the mold 57 upwardly from the seat 196. The apparatus 30 is now prepared for indexing the turntable 58 to the next position and the injection molding device 63 is provided with an additional supply of plastic pellets from the hopper 206 for a subsequent injection molding procedure.

Subsequent to the completion of the injection molding procedure, the turntable 58 is indexed and the particular mold 57 is moved to the open station 65. While operations are occurring at the other stations, the insulating compound 236, which is within the particular mold 57 at the open station 65, is curing to facilitate the insulating of the pin 32 and the sleeve 33 from each other and to secure the assembly as a unit. Thereafter, the turntable 58 is again indexed to move the particular mold 57 from the open station 65 to the unloading station 67.

UNLOADING STATION 67

*Transfer unloading mechanism 66*

As shown in FIG. 19, the transfer unloading mechanism 66 at the unloading station 67 is similar to the transfer loading mechanism 56 at the loading station 54. A rocker shaft 237 is supported for rotation by and between a pair of spaced, vertical bearing plates 238 and 239 which extend upwardly from a horizontal support 241 mounted on the stationary table 59. One end of the shaft 237 extends through the bearing plate 239 and further through another vertical bearing plate 242 spaced from the bearing plate 239. The bearing plate 242 is mounted on and extends upwardly from the support 241. A housing 243 is supported on the bearing plate 242 and houses a pinion (not shown) which is keyed to the one end of the shaft 237 which extends through the housing. A pair of racks (not shown) extends from a pair of air cylinders 244 and 246, respectively, and are in meshing engagement with the pinion to rotate the pinion upon operation of the cylinders in a manner similar to the operation of the rack and pinion arrangement shown in FIG. 7 which controls the movement of the transfer loading mechanism 56.

A pair of rocker arms 247 and 248 are formed with hub sections 249 and 251, respectively, which are spatially keyed to an intermediate portion of the shaft 237 for oscillating movement upon oscillation of the shaft. The free ends of the rocker arms 247 and 248 support a pair of transfer unloading cylinders 252 and 253, respectively, which extend laterally from the outward sides of the arms.

A sleeve 254 is supported by and extends from the inward side of the rocker arm 247 in axial alignment with the cylinder 252.

A piston rod 256 extends from the air cylinder 252 and through the sleeve 254. A pickup finger 257 extends axially from and is supported by the piston rod 256 as particularly viewed in FIG. 20. The diameter of the pickup finger 257 is slightly less than the diameter of the sleeve passage 38 to facilitate sliding movement of the finger within the passage so that the free end of the finger can be moved into engagement with the free end of the pin shank 31 prior to the unloading of the insulated pin-sleeve assembly 34 from the mold 57.

Referring to FIGS. 19 and 20, a piston rod 258 extends from the air cylinder 253 through the rocker arm 248. A gripping and deflashing assembly, designated generally by the reference numeral 260, is supported by and extends from the free end of the piston rod 258. The assembly 260 includes a cylindrical support element 259 which is formed with a central projection 261. The projection 261 of the cylindrical element 259 is inserted into an axial opening 262 formed in the free end of the piston rod 258. Apertures formed in the piston rod 258 and the projection 261 of the cylindrical element 259 are aligned to receive a locking pin 263 so that the cylindrical element is secured to the piston rod for movement therewith and further so that a threaded opening 264 of the cylindrical element extends axially from the piston rod.

A sleeve, designated generally by the reference numeral 266, is formed with threads 267 on one end of the outer surface thereof and is formed with a counterbore having a large diameter passage 268, a small diameter passage 269 and a shoulder 270 which is contiguous with the passages 268 and 269.

A deflashing sleeve, designated generally by the reference numeral 271, is formed with a central passage 272 and a head 273 having tapered outer surface 274 on one end thereof. A cylindrical portion 275 of the deflashing sleeve 271, having a diameter less than the diameter of the head 273, extends axially from the other end of the head to form a shoulder 276.

A pickup plunger support sleeve 277 is formed with a flange 278 near one end thereof and a central passage 279 therethrough. The central passage 279 is formed with internal threads 281 at the flanged end thereof and with a counterbore at the opposite end thereof. A pickup plunger 282 having a reduced shank 283 extending axially on one end thereof is inserted within the threaded end of the passage 279 of the sleeve 277. The plunger 282 is moved through the passage 279 so that the shank 283 moves into the smaller diameter section of the passage counterbore at the opposite end of the sleeve. A compression spring 284 is positioned within an intermediate portion of the passage 279 of the sleeve 277 and is held biasingly against the plunger 282 by a threaded plug (not shown) which is inserted threadedly into the threaded end of the passage.

The reduced section 274 of the deflashing sleeve 271 is inserted into the smaller diameter passage 269 of the sleeve 266 so that the shoulder 276 of the deflashing sleeve abuts the end of the sleeve 266. The plunger support sleeve 277 is then inserted through the large diameter passage 268 of the sleeve 266 so that the tapered end 280 of the plunger support sleeve enters and is moved through the passage 272 of the deflashing sleeve 271 to a position as viewed in FIG. 20. Subsequently, one side of the flange 278 of the plunger support sleeve 277 abuts the contiguous shoulder 270 between the large and small diameter passages 268 and 269 of the counterbored sleeve 266.

A compression spring 286 is inserted into the large diameter passage 268 of the sleeve 266 and engages the other side of the flange 278 of the plunger support sleeve 277. The threaded end of the sleeve 266 is inserted threadedly into the threaded opening 264 of the cylindrical element 259 so that the compression spring 286 is captured between the base of the opening of the cylindrical element and the flange 278 of the plunger support sleeve 277, thereby urging the plunger support sleeve in the assembled position as shown in FIG. 20.

Referring now to FIGS. 1 and 19 through 22, during the period when the indexable turntable 58 is moving to transport the molds 57—57 from one station to another, the transfer unloading mechanism 66 is in an inoperative position, as shown in FIG. 1. In this position, the rocker arms 247 and 248 are extending away from the indexable turntable 58. The positioning of the transfer unloading mechanism 66 in a position as shown in FIG. 1 facilitates movement of the mold 57 into and out of the unloading station 67 so that the mold will not engage any obstructions, thereby precluding the possibility of damage to the elements.

Subsequent to the positioning of the particular mold 57 at the unloading station 67, the cylinders 244 and 246 are operated to rotate the shaft 237 from a position as shown in FIG. 1 to a position as shown in FIG. 19. As the shaft 237 is rotated, the rocker arms 247 and 248 are pivoted to a position where the gripping and deflashing assembly 260 and the pickup finger 257 are in axial alignment with and on opposite sides of the insulated pin-sleeve assembly 34 resting within the mold 57.

Thereafter, the cylinders 252 and 253 are operated to move the pickup assemblies into engagement with opposite ends of the insulated pin-sleeve assembly 34 within the mold 57. As the cylinder 252 is operated, the piston rod 256 is moved through the sleeve 254 until the free end of the finger 257 slides through the flanged end of the passage 38 of the sleeve 33 and engages the end of the shank 31 of the pin 32.

To facilitate movement of the gripping and deflashing assembly 260, a given amount of pressure is applied to the cylinder 253 through a three-way valve 245 (FIGS. 19 and 23) which is supported on an extension 250 extending from the support 241. As the pressure is applied to the cylinder 253, the cylinder is operated whereby the piston rod 258 moves the gripping and deflashing assembly 260 towards the projection 37 of the head 36 of the pin-sleeve assembly 34. As viewed in FIG. 21, subsequently, the end of the shank 283 of the plunger 282 engages the projection 37 of the pin 32 whereby continued forward movement of the plunger ceases.

Subsequent to the engagement by the shank 283 of the plunger 282 with the projection 37 of the pin 32, the plunger support sleeve 277 moves relatively over the plunger until the tapered end 280 of the sleeve enters the mold cavity and is positioned about the head 36 of the pin. During the period when the plunger support sleeve 277 is moving over the plunger 282 and into the mold cavity, the spring 284 is compressing so that the shank 283 of the plunger is urged tightly in engagement with the projection 37 of the pin 32 to facilitate the subsequent gripping of the pin-sleeve assembly 34 for removal of the assembly from the mold 57. When the plunger support sleeve 277 reaches a position as shown in FIG. 21, where the tapered end 280 of the sleeve is positioned within the mold cavity and around the head 36 of the pin 32, the pressure applied to the cylinder 253 is insufficient to move the gripping and deflashing assembly 260 any further to the right, as viewed in FIG. 21. However, the pin-sleeve assembly 34 is now sufficiently gripped for the unloading of the assembly from the mold 57 and the transferring of the assembly to a position over the receptacle 68 (FIGS. 1 and 19).

The cylinder 72 (FIG. 1) which is supported on the overhead support 69 is provided with a piston rod (not shown) extending downwardly therefrom. The free end of the piston rod extending from the cylinder 72 supports a yoke assembly identical to the yoke 142 shown in phantom in FIG. 10. The yoke 142 is supported by the piston rod 146 and is designed to receive the reduced section 139 and the head 141 of the lifting rod 137. During the period when the turntable 58 is moved into the unloading station 67, the yoke, which is supported by the piston rod extending from the cylinder 72, is in a lower position to facilitate reception of the reduced section 139 and the head 141 of the lifting rod 137 (FIG. 10).

Subsequent to the operation of the cylinders 252 and 253, which facilitate the gripping of the insulated pin-sleeve assembly 34, as viewed in FIG. 21, the cylinder 72 is operated to raise the lifting rod 137 and consequently the upper die section 123. As the upper die section 123 is moved upwardly away from the lower die section 126, the gripped, insulated pin-sleeve assembly 34 is exposed within the die cavity 127. Thereafter, the cylinders 224 and 246 are operated to rotate the shaft 66 so that the rocker arms 247 and 248 are moved to transport the gripped, insulated pin-sleeve assembly 34 to a position over the receptacle 68.

During the period when the shaft 237 is rotated to move the rocker arms 247 and 248 from a position as shown in FIG. 19 to a position as shown in FIG. 1, an actuator arm 240, which is secured for rotation to the free end of the shaft 237 extending from the housing 243, moves the three-way valve 245 (FIGS. 1, 19 and 23). The three-way valve 245 has two input ports and one output port. A low pressure line and a high pressure line are connected to the respective input ports. The internal features of the valve are normally positioned so that the low pressure is connected to a valve 318 (FIG. 23) which serves the cylinder 253. When the actuator 240 moves the three-way valve 245, the high pressure is then connected, through the valve 318, to the cylinder 253. In this manner, additional operating pressure is applied to the cylinder 253 so that the piston rod 258 moves the sleeve 266 away from the cylinder.

As the sleeve 266 is moved away from the cylinder 253, the pin gripping elements, including the plunger 282 and the plunger support sleeve 277, remain in the relative position as shown in FIGS. 21 and 22. Due to increased operating pressure applied to the cylinder 253, the sleeve 266 moves the deflashing sleeve 271 over the plunger support sleeve 277 and axially over the head 36 of the pin 32 and the cured insulating compound 236 extending between the head 36 of the pin 32 and the nonflanged end of the sleeve 33. As the deflashing sleeve 271 moves over the head 36 of the pin 32 and over the insulating compound 236, the cull (not shown) and flash (not shown), which extend from the insulating compound formed and cured between the head of the pin and the nonflanged end of the sleeve, are removed.

As the transfer unloading mechanism 66 continues to move the completed pin-sleeve assembly 34 towards the receptacle 68, the actuator arm 240 disengages the three-way valve 245 so that internal biasing facilities within the valve position the valve to facilitate the application of the original lower level of pressure to the cylinder 253. As the pressure applied to the cylinder 253 is decreased to the original level, the gripping and deflashing assembly 260 assumes the gripping position, as shown in FIG. 21, with respect to the pin-sleeve assembly 34.

Subsequently, the gripped, insulated, deflashed pin-sleeve assembly 34 is positioned over the receptacle 68 and the cylinders 252 and 253 are operated to withdraw the piston rods 256 and 258, respectively, so that the pin-sleeve assembly is released and falls into the receptacle.

Referring to FIG. 19, an actuator arm 287 extends from a collar 288 which is secured to the free end of the shaft 237 adjacent to the bearing support 238. As the shaft 237 is rotated to a position as viewed in FIG. 1 to deposit the completed, insulated plug-sleeve assembly 34 within the receptacle 68, the actuator arm 287 engages and closes a switch 289 in the control circuit for indexing the turntable 58. During the period when the transfer unloading mechanism 66 is operating to unload and transfer the insulated pin-sleeve assembly 34 from the mold 57, the switch 289 is open to preclude movement of the turntable 58. In this manner, damage to the transfer unloading mechanism 66 and the molds 57 is precluded during the unloading cycle.

Referring further to FIG. 19, a collar 291 is secured to the shaft between the bearing supports 239 and 242. A plate 292 extends from the collar 291 and supports a stop pin (not shown), which engages a stop rod (not shown) in a manner similar to the arrangements shown in FIG. 9 of the transfer loading mechanism 56, including the stop pin 157 and the stop rod 158.

HYDRAULIC CONTROL CIRCUIT

Referring to FIG. 23, the various cylinders which control the operation of the loading, injection molding and unloading operations are shown connected to fluid lines through respective solenoid control valves in an orientation about the turntable 58, which is shown in phantom. Although not shown, fluid lines extend from the various valves to a common supply. In addition, the three-way valve 245 is shown connected in the fluid line for the cylinder 253. It is noted that there are two input fluid lines to the three-way valve 245, including a low pressure and a high pressure line. A single output line from the valve 245 is connected to a solenoid-controlled valve 318.

Specifically, at the assembly station 44, the assembly pusher cylinder 74 is connected to a valve 293, which is controlled by a solenoid 294. Further, at the loading station 54, the cylinder 71, which facilitates the raising of the upper die section 123 (FIG. 10) during the loading cycle, is connected to a valve 296, which is controlled by a solenoid 297. The transfer gripping cylinders 115 and 118 are connected to valves 298 and 299, respectively, which are controlled by solenoids 301 and 302, respectively. The cylinders 107 and 108, which facilitate the transfer of the gripped pin-sleeve assembly 34 from the transfer net 53 (FIG. 6) to the mold 57, are connected to a common valve 303. The common valve 303 is controlled by a solenoid 304.

At the injection molding station 64, the frame-positioning and seating cylinder 169, which is a double-acting cylinder, is connected to a valve 305. To initiate downward movement of the frame 184 (FIGS. 12 and 13), the valve 305 is controlled by a solenoid 306. A solenoid valve 307 controls the valve 305 during the upward movement of the frame 184. The plug-control cylinders 188 and 189 are connected to valves 308 and 309, respectively, and are controlled by solenoids 311 and 312, respectively. Operation of the ram-control cylinder 222, which is a double-acting cylinder, is controlled by a valve 313. The valve 313 is controlled by a solenoid 314 during the forward movement of the ram 227 (FIGS. 17 and 18) and during the return of the ram the valve is controlled by a solenoid 316.

At the unloading station 67, the transfer unloading cylinders 252 and 253 are connected to valves 317 and 318, respectively, which are controlled by solenoids 319 and 321, respectively. As previously noted, the valve 318 is connected to the three-way valve 245 to facilitate an increase in the level of applied pressure to the cylinder 253. The increase in pressure is necessitated to accomplish the deflashing operation. The cylinder 72, which facilitates the separation of the mold sections 123 (FIG. 10) and 126, is connected to a valve 322 which is controlled by a solenoid 323. The cylinders 244 and 246, which facilitate transfer movement of the unloading mechanism 66 (FIGS. 1 and 19), are connected to a common valve 324, which is controlled by a solenoid 326.

It is noted that all of the cylinders in the fluid system are single acting with the exception of the cylinders 169 and 222 which are double acting. Therefore, when the operating pressure is removed from the single-acting cylinders, the respective pistons normally return to a withdrawn position due to biasing features within the cylinders. It is further noted that each of the plungers (not shown) of a majority of the various solenoids are spring-biased and move against the biasing action when the associated solenoid is energized and return to a rest position due to the biasing force when the solenoid is de-energized.

The plungers of the solenoids 306, 307, 314 and 316 are not supported biasingly within the solenoids. The plungers of the solenoids 306 and 307 are connected mechanically to the valve 305 which controls the application of pressure to the double-acting cylinder 169. Hence, when the solenoid 306 is energized to initiate the downward cycle of the cylinder 169, the associated plunger is moved from a first position within the solenoid to a second position. As the plunger of the solenoid 306 moves, the plunger positions the valve 305 to facilitate the application of pressure to the cylinder 169 in a given direction. Since the plunger of the solenoid 307 is also secured to the valve 305, this plunger is moved when the valve 305 is moved under the control of the solenoid 306. When the solenoid 306 is deenergized, the associated plunger remains in the second position because there is no biasing force to move the plunger back to the first position. When the solenoid 307 is energized, the associated plunger moves from a similar first position within the solenoid to a similar second position. The plunger of the solenoid 307 thereby moves the valve 305 in the reverse direction whereby the plunger of the solenoid 306 is also returned to the first position which it possessed at the beginning cycle. The solenoids 306 and 307 and the respective plungers are now in a position for the next cycle of operation for the cylinder 169. The same procedure occurs when the solenoids 314 and 316 control the positioning of the valve 313.

ELECTRICAL CONTROL CIRCUIT

An electrical control circuit for operating the apparatus 30 is shown in FIGS. 24 and 25. FIGS. 24 and 25 may be aligned, as shown in FIG. 26, to display the circuit in its entirety. A detached contact system is utilized to display the contacts controlled by relays and timing motors. As an example of the correlation between the relay and its associated contact, the relay will be designated as, for example, a relay 332 and its associated contact will be designated contact 332-1, 332-2, etc. Timing motors and contacts associated with the timing motors will be designated in a similar manner, for example, a timing motor 348 and a contact 348-1. Where a series of contacts associated with a given relay or timing motor are referred to, the contacts will be referred to, for example, as contacts 348-1, 2 and 3.

The electrical control circuit includes an operating potential 327 which is connected on one side to a common line 328 and on the opposite side to a switch 329. The switch 329 is connected to a common line 331. Subsequent to the closing of the switch 329, the operating potential 327 is applied between the common lines 328 and 331.

As shown in FIGS. 24 and 25, the various circuits for controlling the operation of the apparatus 30 are connected between the common lines 328 and 331. A hydraulic motor relay 332 is connected in series with a normally open, momentary-closure, pushbutton switch 333 and a normally closed stop switch 334. A normally open, associated relay contact 332-1 is connected in parallel with the start switch 333. Another normally open, associated relay contact 332-1 is connected in series with a hydraulic control motor 336 which facilitates the development of the hydraulic pressure necessary for the operation of the various cylinders used in apparatus 30. Another relay 337 is connected in series with a normally open, momentary-closure, start switch 338 and a normally closed, stop switch 339. A normally open, associated contact 337-1 is connected in parallel with the start switch 338. Another normally open, associated contact 337-2 is connected in series with a motor 341 for facilitating the movement of the turntable 58.

The limit switch 122 (FIG. 6) is connected in series with a missing-pin relay 342. In addition, the switch 122 is also connected in series with a missing-pin indicator lamp 343 which is connected in shunt with the relay 342.

A normally closed, reset switch 344 is connected in series with a normally open, relay contact 342-1. The series combination of the reset switch 344 and the normally open contact 342-1 is connected in shunt with the switch 122 and is also connected in series with the shunt combination of the relay 342 and the indicator lamp 343.

The switches 154 (FIG. 6) and 289 (FIG. 19) are connected in shunt and each are connected in series with a relay 346. The operation of the relay 346, as a result of the closure of the switch 154, precludes movement of the turntable 58 when the loading mechanism 56 is away from the position adjacent to the transfer nest 53. When the unloading mechanism 66 is away from a position over the receptacle 68, the switch 289 facilitates control of the relay 346 to preclude movement of the turntable 58.

The photocell 164 is connected in series with a relay 347. A normally open, associated contact 347-1 is connected in series with the normally open contact 348-1 of the timing motor 348 and is also connected in series with a normally closed contact 349-1 of a turntable indexing control relay 349. The series combination which includes the normally open contacts 348-1 and 347-1 and the normally closed contact 349-1 is connected in series with a missing-sleeve indicator lamp 351 and is further connected in series with a missing-sleeve control relay 352 which is connected in shunt with the indicator lamp 351. A series combination which includes a normally closed, reset switch 353 and a normally open contact 352-1 is connected in series with the shunt combination of the indicator lamp 351 and the relay 352, and is further connected in shunt with the series combination of the normally open contacts 348-1 and 347-1 and the normally closed contact 349-1.

The switch 198 (FIGS. 12 and 13) is connected in series with a relay 354 which is operated in response to the positioning of the frame 184 in the upper position. The timing motor 348 is connected in series with a normally open contact 356-1 of an apparatus control relay 356. The timing motor 348 controls the operation of the various cylinders at the loading station 54 and the unloading station 67. In addition, the timing motor 348 controls the initial operation of a second timing motor 357. The timing motor 357 is connected in series with a normally open contact 357-1 and a normally open contact 356-2. In addition, the contact 357-1 is connected in shunt with a normally open contact 348-2.

An electrically operated clutch 358, which facilitates the mechanical linking of the driving force of the motor 341 to the turntable 58, is connected in series with a normally open contact 349-2. The apparatus control relay 356 is connected in series with a normally open contact 337-3, a normally closed contact 352-2, a normally open contact 348-3, a normally open, momentary-closure, start switch 359, normally closed contacts 342-2 and 342-3, and a normally closed, stop switch 361. The series combination, which includes the contact 342-3 and the switch 361, is connected in shunt with a normally closed contact 349-3. In addition, the series combination, which includes the switch 359 and the normally closed contact 342-2, is connected in shunt with a contact 356-3. The series combination, which includes the contact 348-3, the switch 359 and the contact 342-2, is connected in shunt with a series combination which includes a normally open contact 349-4 and a switch 362. It is noted that the switch 362 is closed when the turntable 58 is moving.

The turntable control relay 349 is connected in series with normally closed contacts 352-3 and 346-1 and with normally open contacts 348-4, 354-1 and 348-5. The contact 348-4 is connected in shunt with a normally open contact 349-5, and the contact 348-5 is connected in shunt with a switch 363. It is noted that the switch 363 is closed when the turntable 58 is moving.

The timing motor 348 controls a series of contacts which control the operation of the loading and unloading of the pin-sleeve assembly 34 into and out of the mold 57 at the loading station 54 and the unloading station 67. In addition, the timing contact 348–2 of the timing motor 348 controls the initial operation of the timing motor 357. The timing motor 357 controls a series of contacts for facilitating the injection molding procedure at the injection molding station 64. The timing motor 348 also facilitates the control of the indexing movement of the turntable 58 during sequential periods when the molds 57 are to be transported between the various stations.

A normally open, timing contact 348–6 is connected in series with the solenoid 294 for controlling the operation of the assembly-pusher cylinder 74 (FIG. 2). A normally open contact 348–7 is connected in series with the solenoid 302 to control the operation of the pin-gripping cylinder 118 (FIG. 6). Another normally open contact 348–8 is connected in series with the solenoid 301, which controls the operation of the sleeve-gripping cylinder 115 (FIG. 6). Still another normally open contact 348–9 is connected in series with the solenoid 297 for controlling the operation of the mold-separating cylinder 71 (FIG. 1). Another normally open contact 348–10 is connected in series with the solenoid 304 for controlling the operation of the transfer-loading cylinders 107 and 108 (FIG. 6).

To effect the injection molding procedure, the timing motor 357 controls a normally open contact 357–2, which is connected in series with the solenoid 306 for controlling the double-acting cylinder 169 (FIGS. 12 and 13) during the downward movement of the frame 184. Another normally open contact 357–3 is connected in series with the switch 199 and each of the shunt-connected solenoids 311 and 312 for operating the cylinders 188 and 189 (FIGS. 12, 13, 14 and 16) to insert the plugs 232 and 234 within the mold 57 prior to the injection of the insulating compound 236 into the mold. Still another normally open contact 357–4 is connected in series with the solenoid 314 for controlling the cylinder 222 during the forward movement of the ram 227. Another normally open contact 357–5 is connected in series with the switch 228 and the solenoid 316 to control the cylinder 222 (FIGS. 17 and 18) during the rearward movement of the ram 227. Another normally open contact 357–6 is connected in series with a normally closed contact 354–2, the switches 201 and 202, and the solenoid 307, which facilitates the control of the cylinder 169 (FIGS. 12 and 13) during the upward movement of the seating frame 184.

During the unloading cycle, a normally open contact 348–11 is connected in series with the solenoid 326, which controls the transfer unloading cylinders 244 and 246 (FIG. 19). Another normally open contact 348–12, which is connected in series with the solenoid 319, facilitates the control of the sleeve-gripping cylinder 252 (FIG. 19). A normally open contact 348–13 is connected in series with the solenoid 321, which facilitates the control of the pin-gripping cylinder 253 (FIG. 19). Still another normally open contact 348–14 is connected in series with the solenoid 323 for facilitating the control of the cylinder 72 (FIG. 1) which separates the mold 57.

It is noted that the heater 214 for the injection molding apparatus 63 (FIGS. 17 and 18) is connected between the lines 328 and 331, and is operated upon the closure of the switch 329.

*Electrical operation*

While the plug assembly and insulating apparatus 30 has been designed to facilitate simultaneous operations at the various stations, the discussion of the electrical operation which follows is directed towards the individual operations at each station. However, it is to be understood that the timing motors 348 and 357 control the operation of the apparatus 30 in such a manner that the simultaneous operations at the various stations are controlled to permit indexing of the turntable 58 when the various operations are not functioning.

Initially, as viewed in FIGS. 24 and 25, an operator closes the switch 329 to facilitate the application of the operating potential 327 across the lines 328 and 331. Upon the closure of the switch 329, the injection heater 214 (FIGS. 17 and 18) is operated to heat the chamber 203 in preparation of the melting of the plastic pellets, which are moved into the chamber bore 207.

Thereafter, the operator depresses the pressure-motor start switch 333, whereby the operating potential 327 is applied to the relay 332. As the relay 332 is operated, the normally open contact 332–1 is closed to hold the relay in the operated condition after the operator releases the depressed switch 333. In addition, upon operation of the relay 332, the normally open contact 332–2 is closed to operate the pressure motor 336, thereby facilitating the application of the build-up of pressure for operation of the various cylinders, as shown in FIG. 23. In the event it is desired to stop the operation of the motor 336, the normally closed, stop switch 334 is depressed to open the circuit which includes the relay 332, whereby the contacts 332–1 and 332–2 revert to the normally open condition.

The operator further depresses the table-indexing motor start switch 338, which facilitates the application of the operating potential 327 to the relay 337, whereupon the normally open contact 337–1 is closed to hold the relay in the operated condition after the operator releases the start switch 338. As the relay 337 is operated, the normally open contact 337–2 is closed to facilitate the operation of the table-indexing motor 341, which is thereafter operating continuously until the stop switch 339 is depressed by the operator. It is noted that, although the motor 341 is operating continuously, the application of the driving force of the motor to the turntable 58 is controlled by the clutch 358.

Upon the operation of the relay 337, the normally open contact 337–3, in a circuit with the apparatus-control relay 356, is closed. In addition, the normally open contact 348–3 is closed near the end of the preceding cycle of operation of the timing motor 348, and remains closed throughout a major portion of the present cycle. Therefore, when a new cycle of operation is initiated through the timing motor 348, the normally open timing contact 348–3 is in the closed state.

With the closure of the normally open contacts 337–3 and 348–3, the circuit for the apparatus-control relay 356 is conditioned for operation of the relay upon closure of the cycle start switch 359. As the operator depresses the cycle start switch 359, the apparatus-control relay 356 is operated. Upon the operation of the relay 356, the associated normally open contact 356–3 is closed to hold the apparatus-control relay in the operated condition.

The operation of the control relay 356 initiates the cycle of operation for the apparatus 30 by facilitating the closure of the normally open contact 356–1, which is connected in series with the timing motor 348. As the contact 356–1 is closed, the operating potential 327 is applied to the timing motor 348 so that the motor starts the initial cycle of operation. It is noted that various normally closed contacts are connected in series with the apparatus-control relay 356, and are designed to prevent operation of the relay in the event certain undesirable occurrences result, which will be described hereinafter.

Subsequent to the assembly of the pin-sleeve assembly 34 at the assembly station 44, the normally open timing contact 348–6 is closed to facilitate actuation of the solenoid 294 so that operating pressure is applied to the pusher cylinder 74 through the valve 293 (FIG. 23). The cylinder 74 is operated to push the assembled pin-sleeve assembly 34 into the transfer nest 53 (FIGS. 2 through 5). Thereafter the contact 348–6 is opened and operating pressure is removed from the cylinder 74 so that the cylinder returns to a rest position.

Subsequently, the normally open timing contacts 348–7 and 348–8 are closed to facilitate the actuation of the solenoids 302 and 301, respectively, for opening the valves 298 and 299 (FIG. 23), respectively. As the valves 298 and 299 are opened, the sleeve-gripping cylinder 115 (FIG. 6) and the pin-gripping cylinder 118, respectively, are operated at the loading station 54.

In the event the pin 32 is missing in the transfer nest 53, as viewed in FIG. 6, the finger 121 will extend into the transfer nest a sufficient distance to permit the cam (not shown), formed on the finger, to close the switch 122. As the switch 122 is closed, the missing-pin relay 342 is operated. In addition, the lamp 343 is operated to indicate to the operator that the pin 32 is missing from the assembly 34 in the transfer nest 53. Upon operation of the relay 342, the normally open contact 342–1 is closed to hold the relay 342 in operation and to retain the indicator lamp 343 illuminated after the switch 122 has been opened.

The gripping of the pin-sleeve assembly 34 at the transfer nest 53 by the pickup fingers 117 and 121 is timed to occur during the period when the turntable 58 is indexing. During this period the normally closed contact 349–3 is open and the circuit for connecting the operating potential 327 to the relay 356 includes, necessarily, the normally closed contact 342–3.

Upon the operation of the relay 342, the normally closed contacts 342–2 and 342–3 are opened. As the contact 342–3 is opened, the operating potential 327 is removed from the apparatus-control relay 356, thereby stopping the operation of the apparatus at this point in the cycle. As operating potential is removed from the apparatus-control relay 356, the contact 356–1 is opened to stop the operation of the timing motor 348. In addition, the contact 356–2 is opened to preclude the operation of the timing motor 357. Further, the holding contact 356–3 is opened to release the holding circuit for the apparatus-control relay 356.

Since the turntable 58 is indexing, the contact 349–4 is closed and the switch 362 is closed by camming action in response to movement of the table. Therefore, the opening of the contact 342–2 will not affect the relay 356 during this portion of the cycle even though the pin 32 is missing in the transfer nest 53. However, the contact 349–3 is open during this portion of the cycle and the opening of the contact 342–3 facilitates the removal of the operating potential from the relay 356 to stop the operation of the apparatus 30.

It is noted that in the event the apparatus 30 is in a shut-down condition and the cam on the finger 121 retains the switch 122 closed, the contact 342–2 is open and prevents the possibility of the operator starting the apparatus by depressing the switch 359 while a pin 32 is missing in the transfer nest 53.

After the operator has inserted manually a pin 32 into the transfer nest 53 to complete the pin-sleeve assembly 34, the reset switch 344 is momentarily depressed to release the holding circuit for the missing-pin relay 342 and the indicator lamp 343. The operator thereafter depresses the start-cycle switch 359 to facilitate the operation of the relay 356, whereby the associated contacts 356–1, 2 and 3 are closed to continue the cycle of operation.

Subsequently, the timing contact 348–9 is closed to energize the solenoid 297 so that the valve 296 (FIG. 23) is opened and the cylinder 71 is operated to separate the upper die section 123 (FIG. 10) from the lower die section 126 to facilitate the transfer of the pin-sleeve assembly 34 into the mold 57. Thereafter the timing contact 348–10 is closed so that the solenoid 304 is energized and the valve 303 is opened to facilitate the application of operating pressure to the transfer cylinders 107 and 108 (FIGS. 6 and 7). As the cylinders 107 and 108 are operated, the transfer loading mechanism 56 is operated to transfer the pin-sleeve assembly 34 from the transfer nest 53 to the mold 57.

Thereafter the contacts 348–7 and 8 are opened to facilitate the closing of the valves 298 and 299, respectively, so that operating pressure is removed from the cylinders 115 and 118, respectively. The pickup fingers 117 (FIG. 6) and 121 withdraw from engagement with the pin-sleeve assembly 34 and contact 348–9 is opened to facilitate the closing of the valve 297 (FIG. 23). As the valve 296 is closed, the cylinder 71 lowers the upper die section 123 (FIG. 10) to a position atop the lower die section 126 to capture the transferred pin-sleeve assembly 34 in the mold cavity. The contact 348–10 is opened to facilitate the closing of the valve 303 (FIG. 23) so that the cylinders 107 and 108 return to a withdrawn position to transfer the transfer loading mechanism 66 to a position as viewed in FIGS. 1 and 6 for a subsequent transfer loading procedure.

In addition to the foregoing operations, one of the molds 57 is resting at the inspection station 62 (FIG. 11) during the period when the pin-sleeve assembly 34 is being transferred to another mold 57 at the loading station 54 (FIG. 1). If the sleeve 33 of the pin-sleeve assembly 34 is missing at the inspection station 62, the illumination provided by the lamp 162 will be directed through the aligned apertures 166 and 167 (FIGS. 11, 14 and 16) of the die sections 123 and 126, respectively, and will operate the photocell 164. As the photocell 164 detects the illumination from the lamp 162, the missing-sleeve relay 347 is operated, whereby the associated, normally open contact 347–1 is closed. The normally open timing contact 348–1 is connected in series with the contact 347–1 to limit the inspection period to a predetermined time when one of the molds 57 is positioned in the inspection station 62. This precludes the possibility of operating the detector system when the table 58 is moving and there are no molds 57 to block the illumination from the lamp 162. In the event the sleeve 33 is missing from the assembly 34 at the inspection station 62, the relay 352 is operated when the timing contact 348–1 is closed. In addition, the lamp 351 is illuminated to indicate to the operator that a sleeve 33 is missing from the pin-sleeve assembly 34 at the inspection station 62.

Upon operation of the relay 352, the normally open contact 352–1 is closed to hold the relay 352 in operation and to retain the lamp 351 in the illuminated state even though any of the contacts 348–1, 347–1 and 349–1 should open. Further, upon operation of the relay 352, the normally closed contact 352–2, which is in series with the apparatus-control relay 356, is opened to remove the operating potential from the apparatus-control relay. Again the various contacts 356–1, 2 and 3 of the apparatus-control relay 356 are opened to stop the operation of the apparatus until the undesirable condition of the missing sleeve 33 has been corrected.

As the operator positions the sleeve 33 in the mold 57 at the unloading station 62 to complete the pin-sleeve assembly 34, the photocell 164 no longer detects the illumination of the lamp 162, and the operating potential is removed from the relay 347, whereby the contact 347–1 is opened. The operator thereafter momentarily depresses the reset switch 353, which removes the operating potential from the relay 352. As the operating potential is removed from the relay 352, the contact 352–1 is opened to condition the holding circuit for the relay from continuing to hold the relay in operation. Further, the contact 352–2 is closed to facilitate the application of operating potential to the apparatus-control relay 356, whereafter the operator again depresses the start-cycle switch 359. Thereafter the associated contacts 356–1, 2 and 3 of the relay 356 are closed to continue the cycle of operation.

Since the normally open contact 356–2 has been closed upon the operation of the apparatus-control relay 356, when the timing motor 348 reaches a predetermined point in the cycle of operation, the closure of the normally open contact 348–2 facilitates the application of the operating potential 327 to the injection molding timing motor 357 to initiate the injection molding cycle. As the timing motor 357 is operated, the normally open contact 357–1 is closed to maintain the timing motor in continuous operation for the injection molding cycle, even though the contact 348–2 subsequently opens under the control of the timing motor 348.

Under the control of the injection molding timing motor 357, the normally open contact 357–2 is closed to facilitate the application of the operating potential 327 to the solenoid 306, so that the solenoid is energized. As the solenoid 306 is energized, operating pressure is applied to the cylinder 169 (FIGS. 12 and 13), to initiate the downward cycle of the cylinder, whereby the frame 184 is lowered to engage and seat the mold 57 in preparation of the injecting of the insulating compound 236 into the mold. As the frame 184 is moved downwardly, the switch 198 is opened to remove the operating potential 327 from the relay 354, which facilitates the opening of the contact 354–1 in the circuit of the turntable indexing relay 349. The opening of the contact 354–1 during the period when the frame 184 is in the lower position precludes movement of the turntable 58 during this period, thereby preventing possible damage to the various elements at the injection molding station 64 during the injection molding procedure. As the frame reaches the lower position (FIGS. 12 and 13), the switch 199 is closed. Thereafter the contact 357–2 is opened. Since the plunger of the solenoid 306 is not spring-biased, the valve 305 remains in the position to facilitate application of pressure to the cylinder 169 to maintain the downward cycle.

Subsequently the timing contact 357–3 is closed to facilitate the application of the operating potential 327 to the solenoids 311 and 312, so that the solenoids are energized. As the solenoids 311 and 312 are energized, the cylinders 188 and 189 (FIGS. 12, 13, 14 and 16) are operated to move the plugs 232 and 234, respectively, into the ends of the mold cavity in preparation for the injection of the insulating compound 236 into the mold.

Thereafter the timing contact 357–4 is closed to facilitate the application of the operating potential 327 to the solenoid 314 so that the solenoid is energized. As the solenoid 314 is energized, the forward cycle of the cylinder 222 is initiated so that the ram 227 (FIGS. 17 and 18) is moved to inject the insulating compound 236 into the mold 57. Subsequently the contact 357–4 is opened so that the solenoid 314 is deenergized. Since the plunger of the solenoid 314 is not spring-biased, the plunger remains in a position which locates the valve 313 to continue the operation of the cylinder 222 on the forward injecting cycle.

As the ram 227 moves to the left, as viewed in FIGS. 17 and 18, the cam 231, formed on the piston rod 224, disengages with the switch 228, whereby the switch is closed. Subsequent to the injection of the insulating compound 236 into the mold 57, the timing contact 357–5 is closed to facilitate the application of the operating potential 327 to the solenoid 316 so that the solenoid is energized. It is noted that the closed switch 228 is included in the circuit with the contact 357–5 for facilitating the application of the operating potential 327 to the solenoid 316.

As the solenoid 316 is energized, the plunger of the solenoid moves the valve 313 to a different position so that the cylinder 222 is operated in the reverse direction to facilitate the movement of the ram 227 (FIGS. 17 and 18) to the rear of the chamber bore 207. Simultaneously the plunger of the solenoid 314 is moved with the valve 313 to position the plunger for the next forward injection cycle. As the piston rod 224 (FIGS. 17 and 18) is withdrawn within the cylinder 222, the cam 231 subsequently engages and opens the switch 228 so that the operating potential 327 is removed from the solenoid 316, even though the timing motor 357 may retain the contact 357–5 in the closed state for a brief additional period. Since the plunger of the solenoid 316 is not spring-biased, the plunger remains in a position to locate the valve 313 so that pressure is applied to the cylinder 222 to hold the ram 227 in a withdrawn position.

Subsequently the contact 357–3 is opened, so that the operating potential 327 is removed from the solenoids 311 and 312 to deenergize the solenoids. As the solenoids 311 and 312 are deenergized, the associated plungers are moved by the biasing action of the respective plunger springs to close the valves 308 and 309, respectively. As the valves 308 and 309 are closed, the inherent biasing force of the cylinders 188 and 189, respectively, move the piston rods 191 and 192, respectively, so that the plugs 232 and 234 (FIGS. 14 and 16), respectively, are withdrawn from the end openings of the mold cavity subsequent to the completion of the injection of the insulating compound 236 into the mold 57. As the plugs 232 and 234 reach a rearwardmost position, the switches 201 and 202 are closed by the cams (not shown) on the piston rods 191 and 192 (FIG. 12), respectively.

Subsequently the timing contact 357–6 is closed. Since the switches 201 and 202 are closed and the contact 354–2 is closed, as a result of the open condition of the switch 198, the operating potential 327 is applied to the solenoid 307 when the contact 357–6 is closed. As the operating potential is applied to the solenoid 307, the solenoid is energized to move the valve 305 to facilitate application of pressure in a given direction within the cylinder 169. The application of pressure initiates the upward cycle of the cylinder 169 so that the frame 184 (FIGS. 12 and 13) is moved to the upper position. It is noted that movement of the valve 305 in response to the energization of the solenoid 307 facilitates the movement of the plunger of the solenoid 306 to its first position in preparation for the next downward cycle of the cylinder 169.

As the frame 184 is moved from the lower position, the switch 199 is opened to preclude accidental operation of the cylinders 188 and 189 and, consequently, movement of the plugs 232 and 234. As the frame 184 reaches the upper position, the switch 198 is again closed to facilitate the operation of the relay 354.

Upon operation of the relay 354, the contact 354–1 is closed to condition for operation the circuit which includes the turntable indexing control relay 349. Further, the contact 354–2 is opened to prevent downward movement of the frame 184 during the period when the turntable 58 is indexing. Subsequently the timing motor 357 completes the cycle of operation for the injection molding procedure, and all of the associated contacts 357–1, 2, 3, 4, 5 and 6 have been opened in preparation for the initiation of the next molding procedure in response to the closure of the contact 348–2.

The timing motor 348 continues to operate during its cycle of operation, which extends on each side of and continues during the cycle of operation of the timing motor 357. The timing contact 348–11 is closed to facilitate the application of the operating potential 327 to the solenoid 326, which is thereby energized. As the solenoid 326 is energized, the valve 324 is opened to facilitate the application of operating pressure to the cylinders 244 and 246 (FIG. 19) so that the cylinders are operated to move the transfer unloading mechanism 66 from a position as viewed in FIG. 1 to a position as viewed in FIG. 19 for subsequently gripping the completed pin-sleeve assembly 34 within the mold 57 at the unloading station 67.

Thereafter the timing contacts 348–12 and 348–13 are closed to facilitate the application of the operating potential 327 to the solenoids 319 and 321, whereby the solenoids are energized. As the solenoids 319 and 321 are energized, the valves 317 and 318, respectively, are opened to apply operating pressure to the cylinders 252 and 253 (FIG. 19). Upon the application of operating pressure, the cylinders 252 and 253 are operated to move the pickup finger 257 and the pickup plunger 282 into the end openings of the mold cavity to facilitate the gripping of the pin-sleeve assembly 34 and the subsequent removal of the assembly from the mold.

The contact 348–14 is then closed to facilitate the application of the operating potential 327 to the solenoid 323, whereby the solenoid is energized. As the solenoid 323 is energized, the valve 322 is opened and the cylinder 72 is operated to raise the upper die section 123 away from the lower die section 126 to reveal the gripped, completed assembly 34 resting within the die cavity 127 of the lower die section. Thereafter, the contact 348–11 is opened to remove the operating potential from the solenoid 326, whereby the solenoid is deenergized. As the solenoid 326 is deenergized, the valve 324 is closed to remove the operating pressure from the cylinders 244 and 246 so that inherent biasing features facilitate the return of the cylinder pistons to a rest position. As the pistons of of the cylinders 244 and 246 return to a rest position, the transfer unloading mechanism 66 moves from a position adjacent to the mold 57 to a position over the receptacle 68, as shown in FIG. 1.

It is noted, as shown in FIG. 1, that during the transfer movement of the unloading mechanism 66 from the mold 57 to the receptacle 68, the actuator arm 240 momentarily and mechanically engages the valve 245 (FIG. 23) to facilitate the application of additional pressure to the cylinder 253, so that deflashing sleeve 271 (FIGS. 20, 21 and 22) moves over the head 36 and the nonflanged end of the sleeve 33 to remove any cull and flash which extends radially from the insulating compound 236 formed between the head and the nonflanged end of the sleeve. After the actuator arm 240 has passed the valve 245, the pressure is reduced in the cylinder 253 to a previous level, whereby the deflashing sleeve 271 is moved to a position which it occupied immediately prior to the shifting of the valve 245 by the actuator arm 240.

As the transfer unloading mechanism 66 positions the completed pin-sleeve assembly 34 over the receptacle 68, the contacts 348–12 and 348–13 are opened to remove the operating potential 327 from the solenoids 319 and 321, respectively, whereby the solenoids are deenergized. As the solenoids 319 and 321 are deenergized, the valves 317 and 321, respectively, are closed to remove operating pressure from the cylinders 252 and 253, respectively. As the operating pressure is removed from the cylinders 252 and 253, the inherent biasing features of the cylinders move the cylinder pistons to a rest position so that the pickup finger 257 and the pickup plunger 282 are withdrawn from engagement with opposite ends of the completed pin-sleeve assembly 34, whereby the assembly falls into the receptacle 68.

Thereafter the contact 348–14 is opened to remove the operating potential 327 from the solenoid 323, whereby the solenoid is deenergized. As the solenoid 323 is deenergized, the valve 322 is closed to remove the operating pressure from the cylinder 72 so that the inherent biasing features of the cylinder move the cylinder piston to a rest position. As the piston of the cylinder 72 is moved to a rest position, the upper die section 123 (FIG. 10) is lowered to a position atop the lower die section 126 in preparation for the indexing movement of the turntable 58.

While the foregoing electrical operations have been discussed with respect to the individual stations, it is again noted that the operations at any given station could be occurring simultaneously with the operations at any of the other stations, depending upon the timing sequence of the timing motors 328 and 357.

After the transfer loading mechanism 56 and the transfer unloading mechanism 66 have returned to the rest positions as shown in FIG. 1, the switches 154 (FIG. 6) and 289 (FIG. 19), respectively, are opened to remove operating potential from the relay 346. As the operating potential is removed from the relay 346, the normally closed contact 346–1, which appears in the circuit with the turntable-indexing control relay 349, is closed. Therefore, if either the transfer loading mechanism 56 or the transfer unloading mechanism 66, or both, have not returned to a rest position as viewed in FIG. 1, the respective switch 154 or 289, or both, will be closed. In the event either of the switches 154 or 289 is closed, the relay 346 is energized to facilitate the opening of the normally closed contact 346–1 which appears in the circuit for the turntable-indexing relay 349. Hence, the opening of the contact 346–1 precludes the indexing movement of the turntable 58 during the periods when the transfer loading mechanism 56 and the transfer unloading mechanism 66 are moving toward or are in a position adjacent to the mold 57.

As previously discussed, when the frame 184 (FIGS. 12 and 13) is moved to the upper position, the switch 198 is closed to energize the relay 354 so that the contact 354–1, which appears in the circuit for the relay 349, is closed. In addition, if the sleeve 33 is present in the mold 57 at the inspection station 62 (FIG. 11), the missing-sleeve relay 352 will not be energized and the normally closed contact 352–3, which is in the circuit for the relay 349, will remain closed.

Subsequent to the completion of the various operations at the transfer loading station 54, the injection molding station 64 and the transfer unloading station 67, the timing contacts 348–4 and 348–5 are closed to facilitate the application of the operating potential 327 to the relay 349 whereby the relay is energized. As the relay 349 is energized, the associated contact 349–2 is closed to facilitate the application of the operating potential 327 to the clutch 358 whereby the clutch is operated to connect the driving force of the motor 341 to the indexable turntable 58 so that the table is moved.

Further, upon operation of the relay 349, the contact 349–5 is closed. In addition, the switch 363 is closed by a cam (not shown) formed on moving portions of the turntable 55. The closure of the contact 349–5 and the switch 363, during movement of the turntable 58, holds the relay 349 in the energized state even though the timing contacts 348–4 and 348–5 are subsequently opened prior to the completion of the indexing movement of the turntable.

As the turntable 58 approaches the completion of the indexing movement thereof, the switch 363 is opened by camming action to facilitate the removal of the operating potential 327 from the relay 349 so that the relay is deenergized. When the relay 349 is deenergized, the contact 349–2 is opened to facilitate the removal of the operating potential 327 from the clutch 358 whereby the driving force of the motor 341 is removed from the turntable 58 and the turntable ceases to move.

During the period when the turntable 58 is indexing, it is necessary to sustain the operation of the timing motor 348. Consequently, it is necessary to sustain the apparatus-control relay 356 in the energized state. Therefore, when the relay 349 is energized, the contact 349–4, which appears in the circuit for the relay 356 is closed. Upon movement of the turntable 58, the switch 362 is closed by a cam (not shown) formed on moving portions of the table structure. Therefore, even though the timing contact 348–3 may open for a brief period near the end of the cycle of operation of the motor 348, the relay 356 is maintained in the energized state by the closure of the contact 349–4 and the switch 362.

As previously discussed, the pin 32 and the sleeve 33 are being assembled at the assembly station 44 (FIG. 2) during the period when the turntable 58 is indexing. The contact 349–3 is open when the turntable is indexing to permit the contact 342–3 to have control of the circuit for the relay 356. In the event the pin 32 is missing at the transfer nest 53 when the pin pick-up finger 121 moves into the pickup position, the switch 122 is closed to facilitate the operation of the relay 342. As the relay 342 is operated, the contact 342-3 is opened to remove the operating potential 327 from the apparatus control relay 356 thereby stopping the operation of the apparatus 30 even though the turntable 58 may be in an indexing movement.

It is noted that the contact 342-2 would also open in response to the missing pin 32. However, the closed contact 349-4 and the closed switch 362 would bypass the contact 342-2 and the opening of this contact would have no effect upon the operation of the relay 356.

In the event the switch 122 is closed to facilitate the shut-down of the apparatus 30 when a pin 32 is missing in the transfer nest 53 and the operator depresses the start switch 359 before the missing pin condition is corrected, the relay 356 will not be operated because the contact 342-2 is open. This is further indication to the operator that an undesirable condition exists and must be corrected before the apparatus 30 can be operated.

It is to be understood that the above-described arrangements are simply illustrative of the invention. Other arrangements may be devised by those skilled in the art which will embody the principles of the invention and fall within the spirit and scope thereof.

What is claimed is:

1. Apparatus for assembling one element within another element in spaced relationship and supporting the assembled elements in preparation for depositing an insulating material between the spaced elements, which comprises:

means for assembling a first element within a second element to form an assembly, a separable means having surfaces complementary in shape to at least one of the surfaces of the second element and for supporting the second element in a predetermined position during a period when an insulating material is deposited between the elements, and means for gripping securely the first element while permitting limited movement of the second element with respect to the securely gripped first element, for transporting the first element and the second element from the means for assembling the two elements, for inserting the assembly into the separable means, for guiding the loosely held second element as the assembly is transported from the means for assembling the two elements to the separable means so that the outer second element is guided in the complementary shaped surfaces in the separable means, and for holding the first element in a predetermined spaced relationship with respect to the surrounding second element prior to and during the depositing of the insulating material.

2. Apparatus for assembling a plug center pin within a plug sleeve in spaced relationship to form a pin-sleeve assembly and supporting the pin-sleeve assembly in preparation for and during an injection molding operation, which comprises:

means for assembling the pin within the sleeve to form a pin-sleeve assembly, a combined separable mold and workholder having portions of surfaces thereof complementary in shape to portions of the surfaces of the sleeve and for supporting the sleeve in a predetermined position during a period when an injection molding operation is performed to inject insulating compound between the pin and the sleeve to insulate electrically the pin and the sleeve from each other, means engaging opposite ends of the pin for gripping securely the pin while permitting limited movement of the sleeve with respect to the securely gripped pin, for transporting the pin and the loosely held sleeve from the means for assembling the pin-sleeve assembly and for inserting the assembly into the combined separable mold and workholder, means for guiding the sleeve as the assembly is transported from the means for assembling the pin-sleeve assembly to the combined separable mold and workholder so that the sleeve is guided in the complementary shaped surfaces in the combined mold and workholder, means for locating and holding the pin in a predetermined spaced and coaxial relationship with respect to the surrounding sleeve within the combined separable mold and workholder prior to and during the injection molding operation, means for injecting the insulating compound between the pin and the sleeve supported in spaced relationship in the combined mold and workholder, and means for removing the insulated pin-sleeve assembly from the combined separable mold and workholder subsequent to the injection of the insulation material between the pin and the sleeve.

3. The apparatus as set forth in claim 2, wherein the means for assembling the pin-sleeve assembly includes:

a first vibratory unit for facilitating the feeding of the sleeves, a second vibratory unit for facilitating the feeding of the pin, an assembly support for receiving the individual sleeve and pin from the first and second vibratory units, respectively, where the pin is inserted partially into the sleeve, a transfer table extending from the assembly support for supporting the assembly as the assembly is moved from the assembly support to a location adjacent to the means for gripping the pin, for transporting the pin-sleeve assembly and for inserting the pin-sleeve assembly into the combined separable mold and workholder, means extending from and supported by the transfer table for causing relative axial movement between the pin and the sleeve towards each other as the pin-sleeve assembly moves over the transfer table so that the pin and the sleeve assume substantially a proper relative position at the location adjacent to the means for gripping, transporting and inserting of the pin-sleeve assembly, and a pusher for moving the assembly from the assembly support, over the transfer table and to the location adjacent to the means for gripping, transporting and inserting of the pin-sleeve assembly into the separable mold.

4. The apparatus as set forth in claim 2, wherein the combined separable mold and workholder includes:

a lower section having a cavity with at least portions thereof having surfaces shaped complementary to at least portions of the surfaces of the sleeve, an upper section having a cavity, portions of which engage at least part of the exposed surfaces of the sleeve resting in the cavity of the lower section for holding the sleeve within the cavity of the lower section to preclude lateral movement of the sleeve but to permit limited axial movement therein, the cavities in the upper and lower sections cooperating to form a combined cavity into which the pin-sleeve assembly is held in preparation of and during the injection molding operation, and each of the cavities of the lower and upper sections being provided with spaced semiannular shoulders which project radially inwardly, are aligned with the associated shoulders formed in the other associated section and cooperates with the associated shoulders when the sections are placed together to form a pair of spaced, annular shoulders projecting radially inwardly within the combined separable mold and workholder for facilitating the locating of the pin and sleeve in a predetermined spaced relationship prior to and during a period when insulating compound is injected between the pin and the sleeve, the portion of the surfaces of the cavities formed in the upper and lower sections extending between the annular shoulders cooperating with the annular shoulders to form a molding cavity to confine the flow of the insulating compound in the desired space between the pin and sleeve during the injection molding operation.

5. The apparatus as set forth in claim 2, wherein the means for gripping, transporting and inserting the pin-sleeve assembly includes:
   a pair of spatially opposed, axially aligned fingers positioned in axial alignment with the pin subsequent to the assembly of the pin with the sleeve by the means for assembling the pin and the sleeve,
   means for causing axial movement of the fingers towards each other and into engagement with the opposite ends of the pin assembled in the sleeve so that the pin is gripped and so that a portion of one finger and a portion of the pin support the sleeve for limited relative axial movement with respect to the pin,
   means attached to the fingers for moving laterally the fingers with the gripped pin-sleeve assembly so that the pin-sleeve assembly is inserted into the combined separable mold and workholder, and
   means for controlling the operation of the means for moving axially the fingers, and the means for moving laterally the fingers with the gripped pin-sleeve assembly in a predetermined sequence so that the pin-sleeve assembly is transported from the means for assembling the pin and the sleeve and inserted into the separable mold.

6. The apparatus as set forth in claim 2, wherein the means for gripping, transferring and inserting the pin-sleeve assembly includes:
   a plurality of spaced supports,
   a shaft supported between and oscillatingly in the spaced supports,
   a pair of arms secured at spaced positions on the shaft for oscillation therewith and extending radially therefrom,
   a finger supported axially and slidably in and projecting transversely of the free end of each arm toward the finger extending from the other arm and in axial alignment therewith,
   means for moving the fingers axially towards each other so that the fingers grip the pin of the assembled pin-sleeve assembly therebetween with the sleeve supported for limited axial movement therearound,
   means for rotating the shaft so that the arms are pivoted therewith and the fingers move transverse to the axis of the fingers to transport and insert the gripped pin-sleeve assembly into the combined separable mold and workholder, and
   means for causing the means for moving axially the fingers and the means for rotating the shaft to operate in a predetermined sequence.

7. The apparatus as set forth in claim 2, which includes means for positioning and seating the combined separable mold and workholder comprising:
   a movable seating frame,
   a seat spaced from and adjacent to the movable seating frame,
   the space defined between the movable seating frame and the seat being sufficient to permit the combined mold and workholder to be moved thereinto, and
   means for moving the seating frame towards the seat after the combined mold and workholder has been moved therebetween so that the frame engages and moves the combined mold and workholder onto the seat in a position adjacent to the means for injecting the insulating compound between the pin and the sleeve and for holding the combined mold and workholder in this position during the period when the insulating compound is injected between the pin and the sleeve supported in a spaced relationship within the combined mold and workholder.

8. The apparatus as set forth in claim 4, wherein the means for locating and holding the pin within the combined separable mold and workholder includes:
   a frame,
   a first plug extending movably from the frame in axial alignment with the combined cavity of the combined separable mold and workholder which is provided by the cooperation of the cavities of the lower and upper sections when the sections are placed together,
   means for moving the first plug into an aperture in one end of the combined cavity of the combined separable mold and workholder to engage a first end of the pin and for moving a radially projecting portion of the first end of the pin into locating engagement with a first of the pair of spaced, annular shoulders projecting radially into the combined cavity so that the pin forms a seal against the first shoulder to preclude the outflow of insulating compound from the desired space between the pin and the sleeve during the injection molding operation,
   a shank extending movably from the frame toward and in axial alignment with the first plug and the combined cavity of the combined separable mold and workholder,
   a second plug supported biasingly and extending axially from the free end of the shank toward and in axial alignment with the first plug and the combined cavity of the combined separable mold and workholder,
   a free end of the second plug formed with an axial seat having structure complementary to the structure of a second end of the pin which extends into the sleeve toward the second plug, and
   means for moving axially the shank into an aperture in the other end of the combined cavity of the combined separable mold and workholder and for moving the plug into a first end of the sleeve within the combined cavity so that the plug seat engages the complementary surface of the second end of the pin and locates precisely and coaxially the portion of the pin within the sleeve and confines the flow of the injected insulating compound to a predetermined space within the first end of the sleeve during the injection molding operation, and for moving the shank into engagement with the first end of the sleeve to move a second end of the sleeve into locating engagement with a second of the pair of spaced annular shoulders projecting radially into the combined cavity so that the engaging surfaces of the second of the pair of shoulders in the combined cavity and the second end of the sleeve form a seal to cooperate with the seal formed by the engaging surfaces of the first end of the pin and the first of the pair of shoulders to confine the flow of the insulating compound in the desired space between the pin and the sleeve during the injection molding operation,
   the surfaces of the first end of the pin, which are in engagement with the first of the pair of shoulders in the combined cavity, being spaced from the surfaces of the second end of the sleeve, which are in engagement with the second of the pair of shoulders in the combined cavity, so that the desired space is defined in the portion therebetween which forms the molding cavity into which the insulating compound is injected into the space between the walls of the sleeve and the coaxially located portion of the pin where, upon curing of the insulating compound, a unitary, insulated plug assembly is formed.

9. The apparatus as set forth in claim 4, wherein the means for removing the insulated pin-sleeve assembly from the combined separable mold and workholder includes:
   a plurality of spaced supports, a shaft supported between and oscillatingly in the spaced supports, a pair of arms secured at spaced positions on the shaft for oscillation therewith and extending radially therefrom, a finger supported axially slidably in and projecting transversely of the free end of a first arm of the pair of arms and positionable in axial alignment with the combined cavity of the combined separable mold and workholder, means for moving the finger axially into an axially extending aperture in one end of the combined cavity of the combined separable mold and workholder so that the finger is inserted into one end of the sleeve and into engagement with one end of the pin extending into the sleeve, an axially slidable support sleeve attached to the free end of the second arm of the pair of arms, and projecting transversely of the free end of the second arm and spaced from and in axial alignment with the finger, a plunger supported biasingly axially within the support sleeve and extending axially towards the finger, means for moving axially the support sleeve with the plunger therein toward and into a second axially extending aperture in the opposite end of the combined cavity so that the free end of the plunger engages the other end of the pin and the support sleeve continues to move axially of the plunger and over a portion of the adjacent end of the pin which is in engagement with the plunger to facilitate a gripping of the associated end of the pin whereby the pin is gripped between the first finger and the combination including the plunger and the support sleeve, means for rotating the shaft so that the arms are pivoted therewith and the finger and plunger move transverse to the axis thereof to remove the insulated pin-sleeve assembly from the combined separable mold and workholder, and means for causing the means for moving axially the first finger, the means for moving the support sleeve and the means for rotating the shaft to operate in a predetermined sequence.

10. The apparatus as set forth in claim 4, wherein the means for removing the insulated pin-sleeve assembly from the combined separable mold and workholder includes:

a plurality of spaced supports, a shaft supported between and oscillatingly in the spaced supports, a pair of arms secured at spaced positions on the shaft for oscillation therewith and extending radially therefrom, a finger supported axially slidably in and projecting transversely of the free end of a first arm of the pair of arms and positionable in axial alignment with the combined cavity of the combined separable mold and workholder, means for moving the finger axially into an axially extending aperture in one end of the combined cavity of the combined separable mold and workholder so that the finger is inserted into one end of the sleeve and into engagement with one end of the pin extending into the sleeve.

a first support sleeve attached to and projecting transversely of the free end of a second arm of the pair of arms in axial alignment with and spaced from the finger, an axially slidable second support sleeve attached to and extending biasingly from the free end of the first support sleeve and extending axially towards and spaced from the finger, a deflashing sleeve supported for sliding movement on and over the second support sleeve in axial alignment with and spaced from the finger, the deflashing sleeve having portions thereof in engagement with portions of the first support sleeve so that, when the first support sleeve moves over and relative to the second support sleeve toward the finger, the deflashing sleeve is moved over the second support sleeve toward the finger, the deflashing sleeve being moved with a bevelled surface on the free end thereof to provide a sharp annular edge to facilitate removal of a plastic cull resulting from the injection molding operation as the deflashing sleeve moves over the exposed insulating compound between the pin and the sleeve of the pin-sleeve assembly, and means for moving the first support sleeve towards the finger so that the plunger moves into the adjacent opening of the combined cavity to engage the associated end of the pin and the second support sleeve slides relatively over the plunger and over a portion of the associated end of the pin, whereby the pin is gripped between the finger and the combination which includes the plunger and the second support sleeve, for moving the first support sleeve over the second support sleeve and for moving the deflashing sleeve over the exposed insulation compound between the pin and the sleeve of the pin-sleeve assembly.

References Cited

UNITED STATES PATENTS

| | | | |
|---|---|---|---|
| 3,063,139 | 11/1962 | Maximoff et al. | 29—203 |
| 3,066,395 | 12/1962 | Hopkins | 29—203 |
| 3,125,781 | 3/1964 | Budzich et al. | 18—5 |
| 3,180,014 | 4/1965 | Maximoff et al. | 29—203 |

WILBUR L. McBAY, *Primary Examiner.*